United States Patent [19]

Hart

Best Available Copy

[11] E Re. 30,408

[45] Reissued Sep. 30, 1980

[54] BRAKE APPARATUS WITH A COMBINED BRAKE CYLINDER AND RESERVOIR

[75] Inventor: James E. Hart, Trafford, Pa.

[73] Assignee: American Standard Inc., Wilmerding, Pa.

[21] Appl. No.: 38,591

[22] Filed: May 14, 1979

Related U.S. Patent Documents

Reissue of:

[64] Patent No.: 4,058,348
Issued: Nov. 15, 1977
Appl. No.: 774,241
Filed: Mar. 4, 1977

[51] Int. Cl.[2] ..... B60T 15/22

[52] U.S. Cl. ..... 303/35

[58] Field of Search ..... 92/49, 64, 212; 303/9, 303/30, 33, 35, 36, 57, 62, 64, 68, 90, 80

[56] References Cited

U.S. PATENT DOCUMENTS

| | | | |
|---|---|---|---|
| 2,031,213 | 2/1936 | Farmer | 303/35 |
| 3,175,869 | 3/1965 | Kirk | 303/33 |
| 3,183,795 | 5/1965 | Kirk | 92/212 |
| 4,003,606 | 1/1977 | Plantan | 303/9 |

*Primary Examiner*—Duane A. Reger
*Attorney, Agent, or Firm*—G. J. Falce; R. W. McIntire, Jr.

[57] ABSTRACT

This invention relates to a novel railway vehicle brake apparatus that comprises a brake cylinder device having two tandem-connected pistons of unequal size, the larger of which is provided with a check valve and cooperates with a hollow cylindrical body in which it is slidably disposed to form on its respective opposite sides two fluid pressure storage reservoirs wherein is stored fluid under pressure for effecting a brake application. This brake apparatus further comprises a novel brake control valve device that is so responsive to a reduction of pressure in a train brake pipe as to first cause simultaneous shifting of both pistons in a brake-applying direction and a transfer of fluid under pressure from one side of the larger piston to the other until a chosen braking force is transmitted through brake rigging to press brake shoes against the wheels of a vehicle. Thereafter, the control valve device is operative to release fluid under pressure from the one side of the larger piston to atmosphere to increase the braking force pressing the shoes against the wheels.

33 Claims, 4 Drawing Figures

BRAKE APPARATUS WITH A COMBINED BRAKE CYLINDER AND RESERVOIR

Matter enclosed in heavy brackets [ ] appears in the original patent but forms no part of this reissue specification; matter printed in italics indicates the additions made by reissue.

BACKGROUND OF THE INVENTION

The brake apparatus installed on railway freight cars being built at the present time includes a brake control valve device that is substantially the same as the brake control valve device shown and described in U.S. Pat. No. 3,175,869, issued Mar. 30, 1965, to Walter B. Kirk and assigned to the assignee of the present application, and a brake cylinder device that is substantially the same as the brake cylinder device shown and described in U.S. Pat. No. 3,183,795, issued May 18, 1965, to Walter B. Kirk and also assigned to the assignee of the present application.

Moreover, as is shown in the above-mentioned U.S. Pat. No. 3,175,869, this railway freight car brake apparatus further includes an auxiliary reservoir and an emergency reservoir which are charged with fluid under pressure from the usual train brake pipe when a brake release is effected, and from which reservoirs fluid under pressure is supplied to the brake cylinder to cause brake shoes to be pressed against the wheels of the freight car when a brake application is effected.

Since these two fluid pressure storage reservoirs are separate items that are necessary in addition to the brake control valve device and the brake cylinder device required for each freight car, it is readily apparent that they increase the total cost of the brake apparatus required on each car.

Accordingly, it is the general purpose of this invention to provide a railway freight car brake apparatus that comprises a novel brake cylinder device that embodies a pair of tandem-connected pistons of unequal diameter, the larger piston cooperating with the brake cylinder body to form on the respective opposite sides of this piston two reservoirs that are charged with fluid under pressure from a train brake pipe. A novel brake control valve device responsive to variations of pressure in the train brake pipe effects the establishment of fluid under pressure forces on the one or the other sides of the two pistons to cause a brake application and a subsequent brake release.

SUMMARY OF THE INVENTION

According to the present invention, a railway freight car fluid pressure brake apparatus comprises a novel brake cylinder device that embodies a pair of tandem-connected pistons of unequal size, each being respectively slidably mounted in a bore in one of a pair of separate hollow cylindrical members. The smaller cylindrical member is disposed within the larger cylindrical member on one side of the larger piston which divides the larger hollow cylindrical member into two fluid pressure storage reservoirs. The larger piston is provided with a check valve to enable flow of fluid under pressure from the reservoir at one side of this piston to the reservoir at the other side. The adjacent sides of the two pistons are connected by a first piston rod and the other side of the larger piston is connected by a larger piston rod and suitable brake rigging to one or more braking elements for effecting a brake application on the tread surface of one or more wheels of the freight car.

A novel brake control valve device is effective, in response to fully charging a train brake pipe, to charge the two storage reservoirs on the respective opposite sides of the larger piston, and also a chamber on the adjacent side of the smaller piston, to the fully charged pressure in the train brake pipe. This brake control valve device is thereafter responsive to a reduction of the pressure in the train brake pipe to simultaneously cause the release of fluid under pressure from the chamber on the adjacent side of the smaller piston to atmosphere and also on equalization of pressure of the fluid under pressure in the two storage reservoirs on the respective opposite sides of the larger piston into a chamber on the other side of the smaller piston to thereby effect simultaneous shifting of the two pistons to a brake application position in which a chosen limited degree of braking force is transmitted through the brake rigging to the braking elements.

Thereafter, this brake control valve device is operative in response to the reduction of the pressure in the train brake pipe to effect a corresponding reduction of the equalized pressure in the reservoir at the one side of the larger piston thereby rendering the fluid under pressure in the reservoir at the other side of this larger piston effective to increase the braking force transmitted to the braking elements in accordance with the degree of the reduction of the pressure in the train brake pipe.

Figure 1:
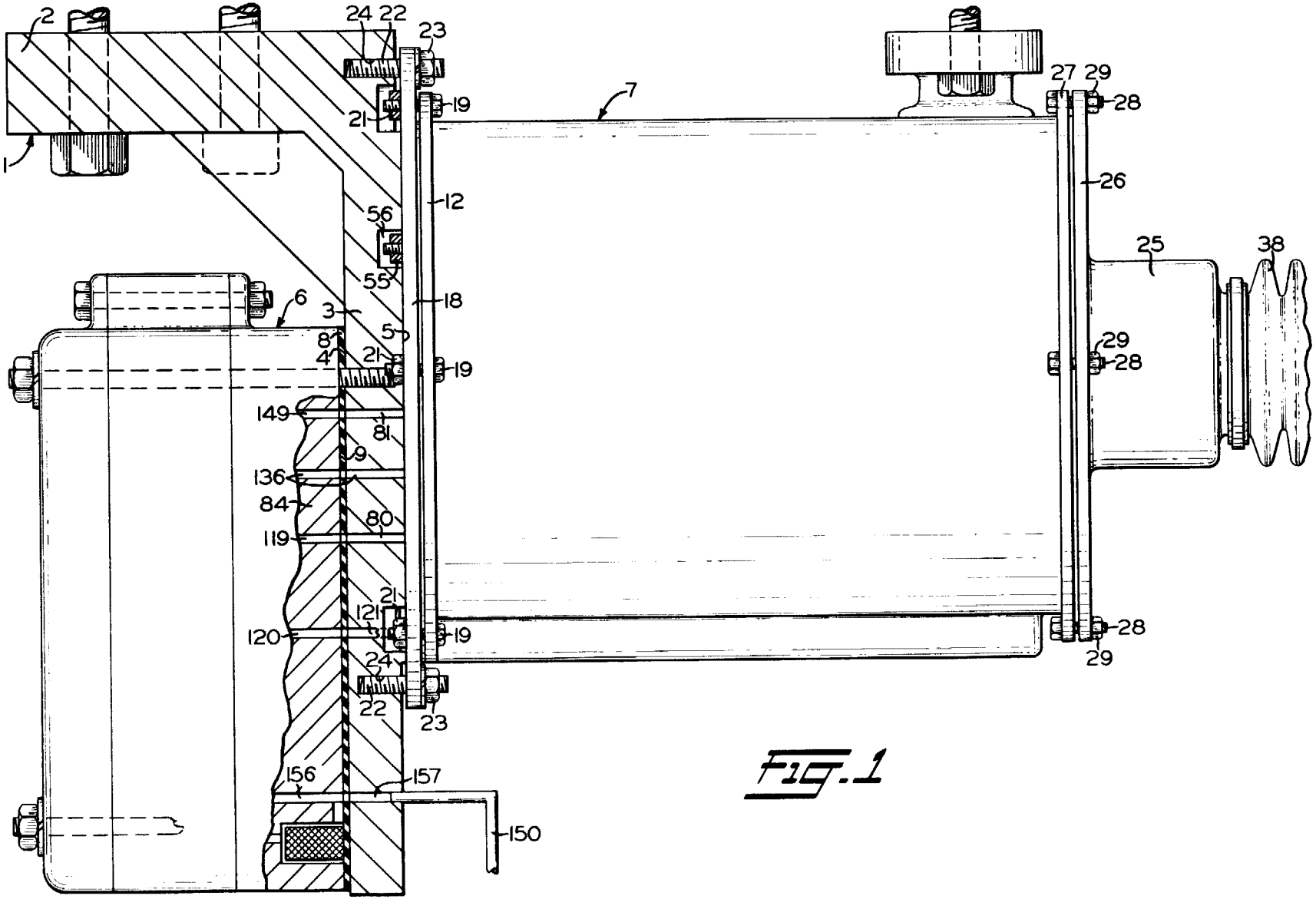
FIG. 1 is a cross-sectional view of a pipe bracket that has a novel brake cylinder device secured to its right-hand side and a novel brake control valve device secured to its left-hand side.
Figure 3A:
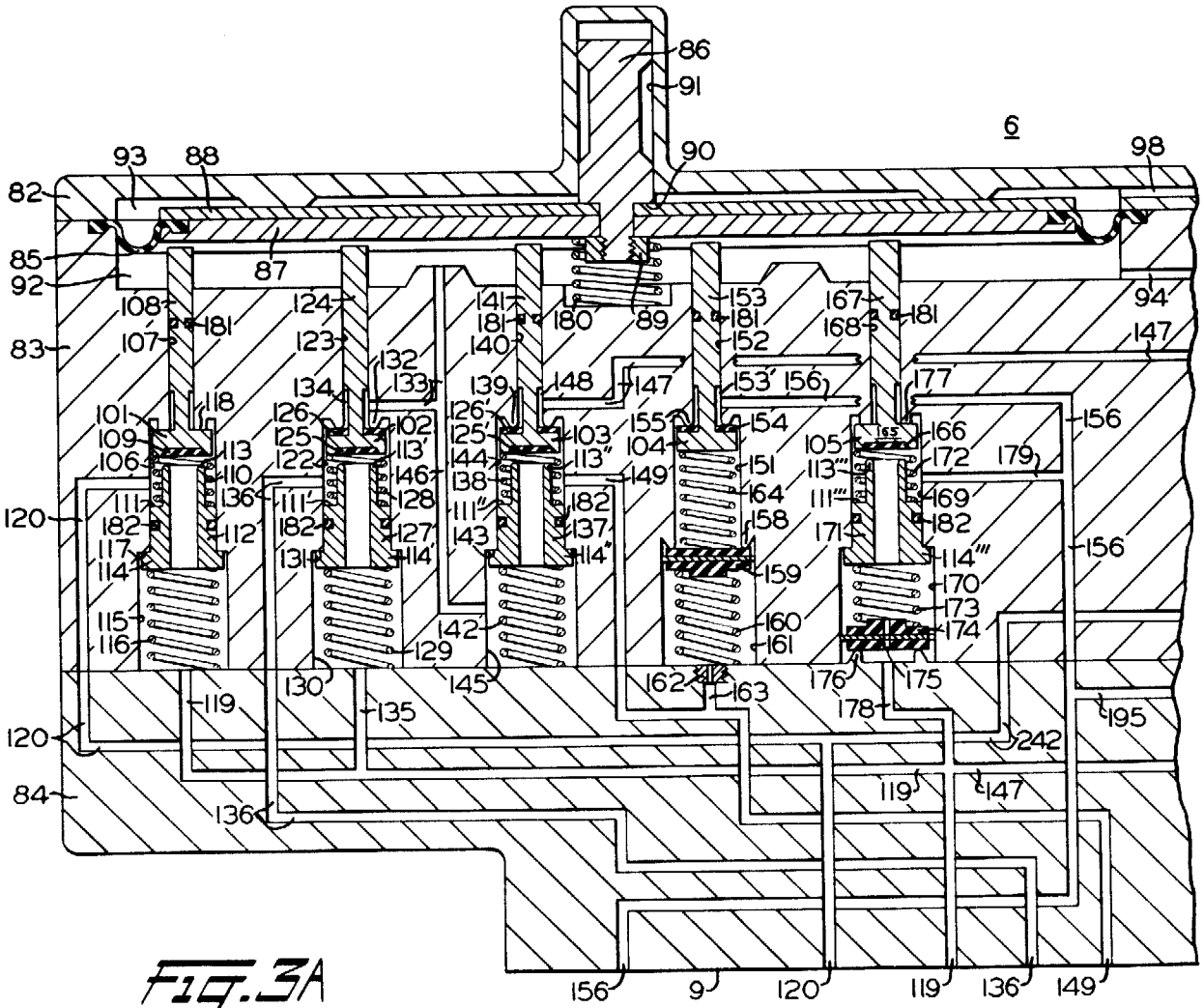
Figure 3B:
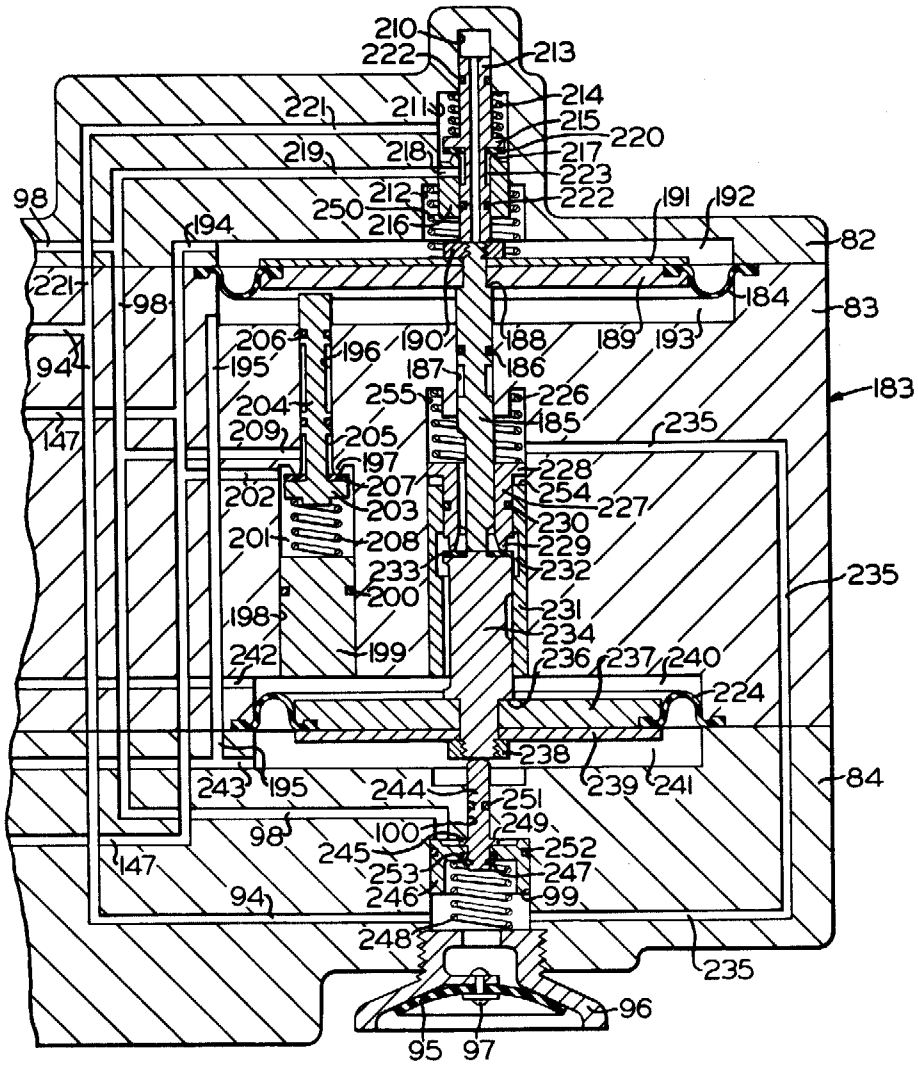

FIG. 3A and FIG. 3B, taken together, constitute a diagrammatic view, in section, of the novel brake control valve device shown in outline in FIG. 1.

DESCRIPTION

As shown in FIG. 1 of the drawings, a novel railway freight car fluid pressure brake apparatus constituting the present invention comprises a pipe bracket 1 that has a horizontal leg 2 and a vertical leg 3. The vertical leg 3 has gasket faces 4 and 5 disposed opposite each other.

The brake apparatus shown in FIG. 1 further comprises a novel brake control valve device 6 secured to the gasket face 4 on the left-hand side of the vertical leg 3 of the pipe bracket 1, and a novel brake cylinder device 7 secured to the gasket face 5 on the right-hand side of this leg 3, a ported gasket 8 being disposed between the gasket face 4 on the leg 3 and a gasket face 9 on the right-hand side of the brake control valve device 6.

Figure 2:
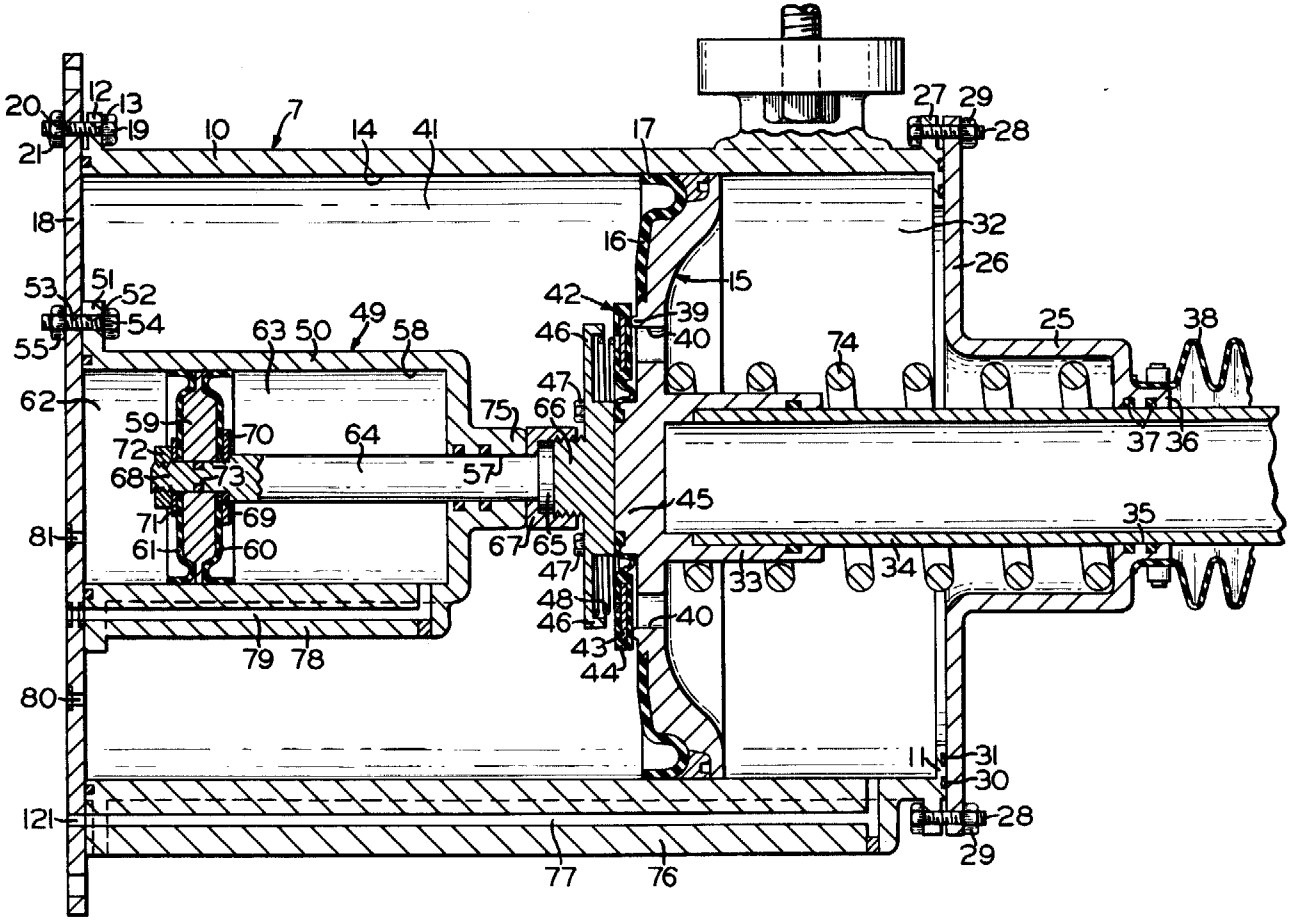
FIG. 2 is a vertical cross-sectional view of the novel brake cylinder device shown in outline in FIG. 1.

As shown in FIG. 2, the novel brake cylinder device 7 comprises a hollow cylindrical member 10 that may be in the form of a casting that has formed integral with its right-hand end an inturned flange 11. Adjacent its left-hand end an out-turned flange 12 is formed integral therewith. This out-turned flange 12 is provided with a plurality of arcuately-arranged smooth bores 13, only one of which appears in FIG. 1.

Formed in cylindrical member 10, as by machining, is a counterbore 14 that extends inward from the left-hand end of this cylindrical member to the inturned flange 11.

Slidably mounted in the counterbore 14 is a first fluid-pressure-actuated brake-applying piston 15.

In order to provide a seal between the wall of the counterbore 14 and the piston 15, there is provided an annular packing cup 16 that is disposed on the left-hand side of this piston 15. This packing cup 16 has an outer portion 17 that is U-shaped in contour, with the inner leg thereof merging with or abutting the left-hand side of the piston 15 and the outer leg slidably engaging the wall surface of the counterbore 14 for preventing leakage of fluid under pressure from the left-hand side of the piston 15 to the right-hand side.

The left-hand end of the counterbore 14 is closed by a pressure head 18 that is secured to the left-hand end of the cylindrical member 10 by a plurality of bolts 19 that extend through the bores 13 in the out-turned flange 12 and a like number of arcuately-arranged smooth bores 20 in the pressure head 18 and a like number of nuts 21 that have screw-threaded engagement with these bolts 19, only one of which appears in FIG. 2.

The pressure head 18 is secured to the gasket face 5 (FIG. 1) on the right-hand side of the leg 3 of the pipe bracket 1 by a plurality of studs 22, two of which appear in FIG. 2, and nuts 23, the left-hand screw-threaded end of these studs 22 having screw-threaded engagement with internal screw threads provided in a like number of bottomed bores 24 in the leg 3 of pipe bracket 1.

As shown in FIG. 2, the right-hand end of the counterbore 14 is closed by a second pressure head 25 that at its left-hand end has formed integral therewith an out-turned flange 26 which abuts the inturned flange 11 that is integral with the right-hand end of the cylindrical member 10.

Adjacent its right-hand end, the cylindrical member 10 is provided with an out-turned flange 27, the outer diameter of which is the same as that of the out-turned flange 26. These out-turned flanges 26 and 27 are provided with a plurality of arcuately-spaced coaxial smooth bores through which extend a like number of bolts 28, only two of which appear in FIG. 2. A nut 29 screw-threaded onto the end of each bolt 28 clamps the out-turned flange 26 against the inturned flange 11.

The flange 11 is provided with two concentric grooves in which are disposed a pair of annular gaskets 30 and 31 that form a seal with the out-turned flange 26 to prevent leakage of fluid under pressure from a pressure chamber or storage reservoir 32 formed by the cylindrical member 10, piston 15 and pressure head 25.

Formed integral with the right-hand side of the piston 15 is an annular boss 33 into which is press-fitted one end of a hollow rod 34 that extends through a bore 35 in an annular boss 36 formed on the right-hand end of the pressure head 25. The wall of the bore 35 is provided with a pair of spaced-apart annular grooves in each of which is disposed an O-ring seal 37 that forms a seal with the outer periphery of the hollow rod 34 to prevent leakage of fluid under pressure from the pressure chamber 32 to atmosphere.

A piston rod (not shown) may be disposed within the hollow rod 34 and connected through a suitable brake rigging (not shown) to brake shoes (not shown) that may be forced against the tread surface of the wheels of a railway vehicle to effect a brake application thereon.

A rubber boot 38 surrounds that portion of the hollow rod 34 that extends outside of the pressure head 25 to protect the outside smooth surface of this rod 34 from damage by such as a piece of flying ballast from a railroad roadbed.

As shown in FIG. 2, the left-hand side of the piston 15 is provided with an annular bead 39. On the inside of this bead 39 the piston 15 is provided with a plurality of arcuately-spaced bores 40, two of which appear in FIG. 2. Flow of fluid under pressure from the pressure chamber 32 on the right-hand side of the piston 15 to a pressure chamber or storage reservoir 41 on the left-hand side of this piston via the bores 40 is normally closed by a one-way valve device 42 that will now be described in detail.

An annular metallic member 43 is embedded in an annular member 44 that is made from some suitable resilient material such as, for example, rubber. The inner periphery of this resilient annular member 44 is clamped between a central boss 45 formed on the left-hand side of the piston 15 and a cup-shaped spring seat 46 that is secured to the piston 15 by a plurality of arcuately-arranged cap screws 47, two of which appear in FIG. 2. A spring 48 interposed between the spring seat 46 and the annular metallic member 43, as shown in FIG. 2, normally biases the resilient annular member 44 against the annular bead 39 to close communication between chamber 32 and chamber 41, which chambers constitute two fluid pressure storage reservoirs that are charged with fluid under pressure in a manner hereinafter described.

The novel brake cylinder device 7 further comprises a positioning cylinder device 49 that is disposed within the chamber 41, as shown in FIG. 2. This positioning cylinder device 49 comprises a cup-shaped cylinder body 50, the left-hand end of which is provided with an out-turned flange 51 that has a plurality of arcuately-arranged smooth bores 52 which are coaxial with a like number of arcuately-arranged smooth bores 53 in the pressure head 18, one of these bores 52 and 53 appearing in FIG. 2 of the drawings. A plurality of bolts 54, one of which appears in FIG. 2, extend through the bores 52 and 53 and have screw-threaded engagement with a like number of nuts 55 that are disposed within recesses 56 (FIG. 1) provided therefor in the gasket face 5 on the right-hand side of the leg 3 of the pipe bracket 1. Thus, the bolts 54 and nuts 55 secure the positioning cylinder device 49 to the pressure head 18 within the pressure chamber 41.

As shown in FIG. 2, the cylinder body 50 is provided with a bore 57 and a coaxial counterbore 58. Slidably mounted within the counterbore 58 is an annular piston 59 that has secured to its respective opposite sides a pair of annular packing cups 60 and 61, each having an outer portion that is U-shaped in contour so as to form a seal with the wall surface of the counterbore 58. These packing cups 60 and 61 and the piston 59 thus form a pair of chambers 62 and 63 on the respective opposite sides of the piston 59.

The piston 59 is operatively connected to the piston 15 by a piston rod 64 that has formed on its right-hand end a collar 65 that abuts a screw-threaded boss 66 formed on the left-hand side, as viewed in FIG. 2, of the spring seat 46. A cup-shaped nut 67 surrounds the collar 65 and has screw-threaded engagement with the screw threads on the boss 66 to connect the piston rod 64 to the piston 15.

Adjacent its left-hand end, the piston rod 64 is provided with a portion 68 of reduced diameter that has a shoulder 69 at its right-hand end and screw threads extending inward a chosen distance from its left-hand end. A first annular plate 70 abuts the shoulder 69 and also the right-hand side of the packing cup 60 while a second annular plate 71 is disposed between the left-hand side of the packing cup 61 and a nut 72 that has screw-threaded engagement with the screw threads on the portion 68. Thus, the nut 72 and plates 70 and 72 serve to rigidly secure the piston 59 to the piston rod 64.

An O-ring seal 73 is disposed in a peripheral annular groove formed on the portion 68 of the piston rod 64 and forms a seal with the annular piston 59 to prevent leakage of fluid under pressure between the chambers 62 and 63.

A brake release spring 74 is interposed between the pressure head 25 and the right-hand side of the larger piston 15 to normally bias this piston 15, and also the smaller piston 59, to the release position shown in FIG. 2 in which position the cup-shaped nut 67 is biased against the right-hand end of an annular boss 75 that is formed integral with the right-hand end of the cylinder body 50.

In order to provide for the supply of fluid under pressure to the chamber 32 on the right-hand side of the larger piston 15 in a manner hereinafter described, the cylindrical member 10 has formed on its bottom a longitudinally-extending boss 76 through which extends a passageway 77 that at its right-hand end opens into this chamber 32, as shown in FIG. 2.

Likewise, in order to provide for the supply of fluid under pressure to the chamber 63 on the right-hand side of the smaller piston 59 in a manner hereinafter described, the cylinder body 50 has formed on its bottom a longitudinally-extending boss 78 through which extends a passageway 79 that at its right-hand end opens into this chamber 63.

As shown in FIGS. 1 and 2, a passageway 80 extends through the leg 3 of the pipe bracket 1 and the pressure head 18 and opens at its right-hand end into the chamber 41 on the left-hand side of the larger piston 15. Also, a passageway 81 extends through this leg 3 and pressure head 18 and opens at its right-hand end into the chamber 62 on the left-hand side of the smaller piston 59.

The novel brake control valve 6, which is shown in outline in FIG. 1 of the drawings, is shown diagrammatically in section when the right-hand edge of FIG. 3A is placed along side of the left-hand edge of FIG. 3B. This brake control valve device 6 shown in FIGS. 3A and 3B has a sectionalized casing comprising an upper casing section 82, a center casing section 83, a lower casing section 84, and a first annular diaphragm 85 that has its outer periphery clamped between the casing sections 82 and 83, it being understood that the three casing sections 82, 83 and 84 are secured together by any suitable means, such as, for example, studs and nuts (not shown).

The inner periphery of the diaphragm 85 is operatively connected to the lower end of a guide stem 86 that extends through coaxial bores in a pair of diaphragm follower plates 87 and 88 and is provided with screw threads adjacent its lower end for receiving a nut 89 which serves, when tightened, to force the follower plate 88 against a shoulder 90 on the stem 86 and thus clamp the inner periphery of the diaphragm 85 between these follower plates 87 and 88. The guide stem 86 is slidably mounted in a bottomed bore 91 provided therefor in the upper casing section 82, as shown in FIG. 3A.

As may be seen from FIG. 3A, the diaphragm 85 and follower plates 87 and 88 cooperate with the casing sections 82 and 83 to form on the respective opposite sides of this diaphragm a pair of chambers 92 and 93.

The chamber 92 is open to atmosphere via a passageway 94 that extends through the casing sections 83 and 84 and past a dished circular shield 95 (FIG. 3B).

The shield 95 is preferably formed of a resilient material, such as rubber, and is held in place, in which its outer periphery rests against an inner cylindrical surface on an insect excluder device 96, by any suitable means, such as, for example, a rivet 97 that extends through a bore in this insect excluder device 96.

As shown in FIGS. 3A and 3B, opening into the chamber 93 above the diaphragm 85 is one end of a passageway 98 that extends through the casing sections 82, 83 and 84 and at its other end opens into the upper end of a counterbore 99 that is coaxial with a bore 100 extending through the lower casing section 84.

As shown in FIG. 3A of the drawings, the center casing section 83 embodies therein below the diaphragm 85 and diaphragm follower plate 87, five poppet-type valves 101, 102, 103, 104 and 105.

The poppet-type valve 101 is disposed in a first counterbore 106 that is coaxial with a bore 107 which extends from the upper end of this counterbore 106 through the center casing section 83 to the atmospheric chamber 92 below the diaphragm 85.

The poppet valve 101 has formed integral with the upper side thereof a valve stem 108 that extends through the bore 107 into the chamber 92. A resilient disc 109 constructed of, for example, rubber, is bonded to the lower side of the valve 101, and a first spring 110 is interposed between this lower side of the valve 101 and a shoulder 111 formed on a hollow cylindrical valve seat member 112 that is slidably mounted in the counterbore 106.

As shown in FIG. 3A, the hollow valve seat member 112 has an annular valve seat 113 formed at its upper end and an out-turned flange 114 formed at its lower end.

This out-turned flange 114 is disposed in a second counterbore 115 that extends into the central casing section 83 from the lower end thereof and has a diameter that is greater than the diameter of the above-mentioned counterbore 106 that is coaxial therewith. A second spring 116 disposed in the counterbore 115 is interposed between the upper end of the lower casing section 84 and the out-turned flange 114 to normally bias this flange 114 against a shoulder 117 formed at the upper end of the counterbore 115.

It will be noted from FIG. 3A that the length of the hollow cylindrical valve seat member 112 is such that, when the spring 116 biases the out-turned flange 114 against the shoulder 117 and the spring 110 biases the upper side of the poppet valve 101 against an annular stop 118 formed on the center casing section 83 at the lower end of the bore 107, the resilient disc 109 bonded to the lower side of the valve 101 will be disposed above and out of seating engagement with the annular valve seat 113 at the upper end of the hollow valve seat member 112.

Moreover, the upper end of the valve stem 108 of the valve 101 will be disposed a short distance below the lower side of the diaphragm follower plate 87.

As shown in FIG. 3A, opening into the lower end of the counterbore 115 is one end of a passageway 119 that extends through the lower casing section 84 and at its other end opens at the hereinbefore-mentioned gasket face 9 which is formed on the lower side, as viewed in FIGS. 3A and 3B, of the lower casing section 84 of the brake control valve device 6. As shown in FIGS. 1 and 2, this other end of the passageway 119 is in alignment with the left-hand end of the hereinbefore-mentioned passageway 80 in the leg 3 of the pipe bracket 1, which passageway 80 opens into the chamber 41.

Referring to FIG. 3A of the drawings, it will be seen that one end of a passageway 120 opens at the wall surface of the counterbore 106 at a location that is above the shoulder 111 on the valve seat member 112 while the spring 116 biases the flange 114 on the lower end of this member 112 against the shoulder 117 at the upper end of the counterbore 115. This passageway 120 extends through the casing sections 83 and 84 and at its other end opens at the gasket face 9. As shown in FIGS. 1 and 2, this other end of the passageway 120 is in alignment with the left-hand end of a passageway 121 that extends through the leg 3 of the pipe bracket 1 and the pressure head 18 and has its right-hand end in alignment with the left-hand end of the passageway 77.

From the foregoing, it is apparent that, while the valve 101 is unseated from the valve seat 113, the chamber 41 at the left-hand side of the piston 15 (FIG. 2) is connected to the chamber 32 at the right-hand side of this piston via passageway 80, passageway 119 (FIGS. 1 and 3A), counterbore 115 (FIG. 3A), the interior of hollow valve seat member 112, past valve seat 113, counterbore 106, passageway 120 (FIGS. 3A and 1), passageway 121 (FIGS. 1 and 2) and passageway 77 (FIG. 2).

As shown in FIG. 3A, the poppet-type valve 102 is disposed in a third counterbore 122 that is coaxial with a bore 123 which extends from the upper end of this counterbore 122 through the casing section 83 to the chamber 92.

The poppet valve 102 has formed integral with the upper side thereof a valve stem 124 that extends through the bore 123 into the chamber 92. The lower side of the valve 102 has a resilient disc 125 bonded thereto and an annular resilient member 126 is disposed about the stem 124 and bonded to the upper side of this valve 102.

A hollow cylindrical valve seat member 127 is slidably mounted in the counterbore 122. This valve seat member 127 is identical in construction and interchangeable with the valve seat member 112. Consequently, the corresponding elements of this valve seat member 127 will be distinguished from those of the member 112 by the addition of a prime (') to the numeral for each respective corresponding element of this valve seat member 127.

Consequently, a third spring 128 is interposed between the lower side of the valve 102 and the shoulder 111' on the valve seat member 127, and a fourth spring 129, disposed in a counterbore 130 coaxial with counterbore 122 and of larger diameter, is interposed between the upper end of the casing 84 and the out-turned flange 114'. Therefore, the spring 129 biases flange 114' against a shoulder 131 formed at the upper end of the counterbore 130. This enables the spring 128 to bias the annular resilient member 126 on the upper side of valve 102 against an annular valve seat 132 formed at the lower end of the bore 123 and the resilient disc 125 that is bonded to the lower side of the valve 102 out of seating engagement with the valve seat 113'. In this position of the valve 102, the upper end of the valve stem 124 of this valve 102 will be disposed the same distance below the lower side of the diaphragm follower plate 87 as the upper end of the valve stem 108 of valve 101, and communication will be closed between the interior of the counterbore 122 and a passageway 133 that opens at one end at the wall surface of the bore 123 in alignment with an elongated peripheral annular groove 134 on the valve stem 124 and at the opposite end into the chamber 92 that is open to atmosphere, as hereinbefore explained.

Opening into the lower end of the counterbore 130 is one end of a short passageway 135 that, as shown in FIG. 3A, extends through the casing section 84 and at its opposite end opens into the passageway 119 intermediate the ends thereof.

As further shown in FIG. 3A, one end of a passageway 136 opens at the wall surface of the counterbore 122 at a location that is above the shoulder 111' on the valve seat member 127 while the spring 129 biases the flange 114' against the shoulder 131. This passageway 136 extends through the casing sections 83 and 84 and at its other end opens at the gasket face 9 where, as shown in FIGS. 1 and 2, it continues through the leg 3 of the pipe bracket 1 and has its right-hand end in alignment with the left-hand end of the passageway 79.

From the foregoing, it is apparent that, while the valve 102 (FIG. 3A) is unseated from the valve seat 113' and seated on valve seat 132, the chamber 41 (FIG. 2) is connected to the chamber 63 via passageways 80, 119 and 135 (FIG. 3A), counterbore 130, the interior of hollow valve seat member 127, past valve seat 113', counterbore 122, passageway 136 and passageway 79.

The poppet-type valve 103 and a hollow cylindrical valve seat member 137 are identical in construction and interchangeable with the valve 102 and valve seat member 127. Consequently, the corresponding parts of the valve 103 will be distinguished from those of the valve 102 by the addition of a prime (') to the numeral for each respective corresponding element of this valve 103.

Likewise, the corresponding parts of the valve seat member 137 will be distinguished from those of the members 112 and 127 by the addition of a double prime (") to the numeral for each respective corresponding element of this valve seat member 137.

Accordingly, a fifth spring 138 is interposed between the lower side of the valve 103 and the shoulder 111" on the valve seat member 137 to seat the annular resilient member 126' on an annular valve seat 139 formed at the lower end of a bore 140 through which extends a valve stem 141 of the valve 103.

Likewise, a sixth spring 142 is interposed between flange 114" and the upper end of the casing 84 to normally bias this flange 114" against a shoulder 143 formed at the lower end of a counterbore 144 that is coaxial with the bore 140 and a larger counterbore 145 in which is disposed the spring 142.

As shown in FIG. 3A, one end of a passageway 146 opens at the wall surface of the counterbore 145 intermediate the ends thereof and the other end opens into the passage 133 which is open to atmosphere. Therefore, the interior of the counterbore 145 is normally vented to atmosphere since the spring 138 maintains the annular resilient member 126' seated on the valve seat 139 which prevents flow of fluid under pressure into the counterbores 144 and 145 from one end of a passageway 147 that opens at the wall surface of the bore 140 opposite an elongated peripheral annular groove 148 provided on the valve stem 141 of valve 103. This passageway 147 extends through the casing sections 83 and 84 and at its other end opens into the passageway 119 which is connected to the chamber 41 (FIG. 2) via the pathway hereinbefore described.

As shown in FIG. 3A, one end of a passageway 149 opens at the wall surface of the counterbore 144 at a location that is always above the shoulder 111'' on the valve seat member 137. This passageway 149 extends through the casing sections 83 and 84 and at its other end opens at the gasket face 9 in alignment with the hereinbefore-mentioned passageway 81, as is shown in FIGS. 1 and 2.

Therefore, it is apparent from FIGS. 2, 3A and 3B that the chamber 62 (FIG. 2) is normally open to atmosphere via passageways 81 and 149, counterbore 144 (FIG. 3A), hollow valve seat member 137, counterbore 145, passageways 146 and 133, chamber 92, passageway 94 (FIG. 3B), lower end of counterbore 99 and past resilient shield 95. So long as the chamber 62 is thus vented to atmosphere, the spring 74 is able to maintain the pistons 15 and 59 and the hollow rod 34 in the brake release position in which they are shown in FIG. 2.

The poppet-type valve 104 (FIG. 3A) constitutes a quick service valve for controlling flow of fluid under pressure from a brake pipe 150 (FIG. 1) to the brake cylinder chamber 62 (FIG. 2) when a brake application is effected. This valve 104 is disposed in a counterbore 151 that is coaxial with a bore 152 in which is disposed a valve stem 153 that is integral with the upper side of valve 104 and extends through an annular resilient member 154 that is bonded to the upper side of this valve 104. The valve stem 153 is provided at its lower end with an elongated peripheral annular groove 153' that, while the member 154 is unseated from an annular valve seat 155 formed at the lower end of the bore 152, establishes a communication between one end of a passageway 156 that opens at the wall surface of the bore 152 and the interior of the counterbore 151. This passageway 156 extends through the casing sections 83 and 84 and at its other end opens at the gasket face 9 in alignment with a passageway 157 (FIG. 1) in the leg 3 of the pipe bracket 1 to which passageway 157 the brake pipe 150 is connected.

As shown in FIG. 3A, formed at the lower end of the counterbore 151 is an annular valve seat 158 against which a check valve 159 is normally biased by a seventh spring 160 that is disposed in a counterbore 161 coaxial with the bore 152 and interposed between the lower side of this check valve 159 and the casing section 84.

As further shown in FIG. 3A, opening into the lower end of the counterbore 161 via a choke 162 therein is one end of a passageway 163 that extends through the casing section 84 and at its other end opens into the hereinbefore-mentioned passageway 149 that is connected to the chamber 62 (FIG. 2) via the passageway 81.

It will be noted from FIG. 3A that an eighth spring 164 is disposed in the counterbore 151 and interposed between the lower side of the valve 104 and the upper side of the check valve 159. The strength of this spring 164 is less than that of the spring 160 thereby enabling the spring 160 to normally seat the check valve 159 on its seat 158 and the spring 164 to seat the resilient member 154 secured to the upper side of the valve 104 on the annular valve seat 155 formed at the lower end of the bore 152.

When the resilient member 154 secured to the upper side of the valve 104 is unseated from the valve seat 155 by the diaphragm follower plate 87 shifting the valve stem 153 downward, in a manner hereinafter explained, the strength of the spring 160 is such as to enable flow of fluid under pressure from the brake pipe 1 to the chamber 62 (FIG. 2) on the left-hand side of the piston 59 until the pressure in this chamber 62 and the interior of the counterbore 161 is increased to a chosen value.

Finally, the poppet-type valve 105 constitutes a charging valve 165 to enable charging of the chambers 41 and 32 (FIG. 2) in the novel brake cylinder device 7 from the brake pipe 150. This poppet valve 105 (FIG. 3A) has a resilient disc 166 bonded to its lower side and a valve stem 167 extending from its upper side through a bore 168 in the casing section 83 into the chamber 92. This bore 168 opens at its lower end into a coaxial counterbore 169 that in turn at its lower end opens into a coaxial counterbore 170 of larger diameter.

A hollow cylindrical valve seat member 171 that is identical with the valve seat members 112, 127 and 137 is slidably mounted in the counterbore 169. Consequently, the corresponding elements of this valve seat member 171 will be distinguished from those of the members 112, 127 and 137 by the addition of a triple prime (''') to the numeral for each respective corresponding element of this valve seat member 171.

Accordingly, a nineth spring 172 is interposed between the lower side of the poppet valve 105 and the shoulder 111''' on the valve seat member 171 and a tenth spring 173, which is stronger than the spring 172, is interposed between the out-turned flange 114''' on the lower end of this valve seat member 171 and a check valve 174 that is disposed in the counterbore 170 and has a small passageway extending therethrough which constitutes a charging choke 175. Therefore, this stronger spring 173 normally biases the check valve 174 against an annular valve seat 176 formed on the lower casing section 84 while the weaker spring 172 biases the poppet valve 105 against an annular stop 177 formed on the casing section 83 at the lower end of the bore 168 therein.

As shown in FIG. 3A, opening within the annular valve seat 176 is one end of a short passageway 178 that extends through the casing section 84 and opens at its other end into the passageway 119 at the junction of the passageway 147 with this passageway 119.

As is also shown in FIG. 3A, one end of a passageway 179 opens at the wall surface of the counterbore 169 at a location that is always above the shoulder 111''' on the valve seat member 171. This passageway 179 extends through the casing section 83 and at its other end opens into the hereinbefore-mentioned passageway 156 intermediate the ends thereof.

In order to normally bias the diaphragm follower plate 87 out of engagement with the upper end of the valve stems 108, 124, 141, 153 and 167, a spring 180 is interposed between the lower side of this follower plate 87 and the casing section 83.

Furthermore, each of the valve stems 108, 141, 153 and 167 is provided intermediate its ends with a peripheral annular groove in which is disposed an O-ring seal 181 that forms a seal with the wall surface of the respective bore in which these valve stems are disposed to prevent leakage of fluid under pressure into the chamber 92 that is open to atmosphere, as hereinbefore explained.

Moreover, each of the valve seat members 112, 127, 137 and 171 is provided intermediate its ends with a peripheral annular groove in which is disposed an O-ring seal 182 that forms a seal with the wall surface of the respective counterbore in which these valve seat members are slidably disposed to prevent leakage of fluid under pressure between the peripheral surface of these valve seat members and the wall surface of the respective counterbore.

As shown in FIG. 3B of the drawings, the novel brake control valve device 6 further comprises an application and release control valve mechanism 183 that is embodied in the hereinbefore-mentioned casing sections 82, 83 and 84.

The application and release control valve mechanism 183 comprises a first annular diaphragm 184 that has its outer periphery clamped between the casing sections 82 and 83.

The inner periphery of the diaphragm 184 is operatively connected to the upper end of a stem 185 that is fluted for a chosen distance from its lower end. Above this fluted portion, the stem 185 is provided with a peripheral annular groove in which is disposed an O-ring seal 186 that forms a seal with the wall surface of a bore 187 that extends through the center casing section 83. This stem 185 is further provided with a shoulder 188 against which rests a first diaphragm follower plate 189 and external screw threads for receiving a nut 190 which serves, when tightened, to force the follower plate 189 against the shoulder 188 and clamp the inner periphery of the diaphragm 184 between this plate 189 and a second follower plate 191.

As may be seen from FIG. 3B, the diaphragm 184 and follower plates 189 and 191 cooperate with the casing sections 82 and 83 to form on the respective opposite sides of this diaphragm a pair of chambers 192 and 193.

Opening into the chamber 192 is one end of a passageway 194 that extends through the casing sections 82 and 83 and at its opposite end opens into the passageway 147 intermediate the ends thereof.

Opening into the chamber 193 is one end of a passageway 195 that extends through the casing sections 83 and 84 and at its opposite end opens into the passageway 156 intermediate the ends thereof.

As shown in FIG. 3B, a bore 196 disposed in parallel spaced-apart relationship to the bore 187 extends into the casing section 83 from the chamber 193 and has an annular valve seat 197 formed at its lower end. A bore 198 that is coaxial with and of larger diameter than the bore 196 has a spring seat 199 pressed thereinto. This spring seat 199 is provided with a peripheral annular groove thereon in which is disposed an O-ring seal 200 to prevent leakage of fluid under pressure from a chamber 201 above this spring seat. This chamber 201 is connected to the passageway 147 by a short passageway 202 and has disposed therein a poppet-type valve 203.

The poppet-type valve 203 has formed integral with one side thereof a valve stem 204 that extends through the bore 196 into the chamber 193. This stem 204 is provided adjacent the valve 203 with an elongated peripheral annular groove 205 above which is a peripheral annular groove that has an O-ring seal 206 disposed therein to form a seal with the wall surface of the bore 196 and thereby prevent leakage of fluid under pressure between the chambers 193 and 201. A resilient annular member 207 constructed of, for example, rubber, is disposed about the stem 204 and bonded to the upper side of the valve 203. The spring 208 interposed between the spring seat 199 and the lower side of the valve 203 normally biases the annular member 207 against the valve seat 197 to close communication between the chamber 201 and one end of a passageway 209 that opens at the wall surface of the bore 196 at a location in alignment with the groove 205 on the stem 204. This passageway 209 extends through the casing section 83 and at its other end opens into the passageway 98 intermediate the ends thereof.

As shown in FIG. 3B, the upper casing section 82 is provided with a bottomed bore 210 and two coaxial counterbores 211 and 212. A hollow cylindrical valve member 213 having a spring 214 disposed thereabout on the upper side of a collar 215 integral therewith is slidably mounted in the bottomed bore 210 after which a bushing 216 having an annular valve seat 217 on its upper end is pressed into the counterbore 211 until a port 218 in this bushing is in alignment with that end of a passageway 219 that opens at the wall surface of the counterbore 211. This passageway 219 extends through the casing section 82 and at its other end opens into the passageway 98 intermediate the ends thereof. A resilient annular member 220 is bonded to the lower side of the collar 215 and is normally biased against the annular valve seat 217 by the spring 214 interposed between the upper side of the collar 215 and the upper end of the larger counterbore 211 to close communication between the passageway 219 and a passageway 221 that at one end opens at the wall surface of the counterbore 211 and at the other end into the passageway 94 intermediate the ends thereof.

As shown in FIG. 3B, the cylindrical valve member 213 is provided adjacent each of its opposite ends with a peripheral annular groove in each of which is disposed an O-ring seal 222. The upper O-ring seal 222 forms a seal with the wall surface of the bottomed bore 210 and the lower O-ring seal 222 forms a seal with the wall surface of the bushing 216.

As further shown in FIG. 3B, the valve member 213 is provided below the resilient member 220 with an elongated peripheral annular groove 223 through which fluid under pressure flows from the passageway 219 to the passageway 221 when the member 220 is unseated from the valve seat 217 in a manner hereinafter explained.

The application and release control valve mechanism 183 shown in FIG. 3B of the drawings further comprises a second annular diaphragm 224 that has its outer periphery clamped between the casing sections 83 and 84. This diaphragm 224 is connected to a valve mechanism for releasing fluid under pressure from the chamber 32 (FIG. 2) in the brake cylinder device 7 to atmosphere to cause the fluid under pressure present in the chambers 62 and 41 and acting respectively on the left-hand side of the pistons 59 and 15 to increase the braking force pressing the brake shoes against the tread surface of the wheels of the vehicle in accordance with the degree of reduction of the pressure in the chamber 32.

As shown in FIG. 3B, extending into the casing section 83 from the lower end thereof is a counterbore 225 that is coaxial with the hereinbefore-mentioned bore 187 into the upper end of which counterbore 225 extends the fluted portion of the valve stem 185.

In assembling the application and release control valve mechanism 183, a spring 226 is first placed in the counterbore 225 after which a hollow cylindrical exhaust valve seat member 227 is inserted into this counterbore 225 so that an out-turned flange 228 integral with the upper end, as viewed in FIG. 3B, of this valve seat member 227 abuts the lower end of the spring 226. This exhaust valve seat member 227 is provided at its lower end with an annular exhaust valve seat 229 and intermediate its ends with a peripheral annular groove in which is disposed an O-ring seal 230 that forms a seal with the wall surface of a bushing 231 that is next pressed into the counterbore 225 from the lower end thereof. As shown in FIG. 3B, the interior wall surface of the bushing 231 intermediate the ends thereof has formed therein, as by a machining operation, an elongated annular groove 232, it being noted that the lower end of the exhaust valve seat member 227 on which is formed the exhaust valve seat 229 terminates between the upper and lower ends of this groove 232.

While the parts of the application and release control valve mechanism 183 occupy the position shown in FIG. 3B of the drawings, the exhaust valve seat 229 abuts a resilient annular member 233 that is bonded to the upper end of a fluted valve stem 234 slidably mounted in the bushing 231 so that this end of the stem 234 and the resilient annular member 233 constitute an exhaust valve that when seated on the seat 229 closes communication between the lower and upper ends of the counterbore 225.

It will be noted that, while the exhaust valve seat member 227 occupies the position shown in FIG. 3B, the lower side of the out-turned flange 228 is disposed a short distance above the upper end of the bushing 231 and the upper side of this flange is disposed below that end of a passageway 235 that opens at the wall surface of the counterbore 225. This passageway 235 extends through the casing sections 83 and 84 and at its other end opens at the wall surface of the hereinbefore-mentioned counterbore 99 in the casing section 84 above the shield 95.

As shown in FIG. 3B, adjacent its lower end, the stem 234 is provided with a shoulder 236 against which rests a first diaphragm follower plate 237 and external screw threads for receiving a nut 238. This nut 238 serves, when tightened, to force the follower plate 237 against the shoulder 236 and clamp the inner periphery of the diaphragm 224 between this plate 237 and a second follower plate 239.

Consequently, the diaphragm 234 and follower plates 237 and 239 cooperate with the casing sections 83 and 84 to form on the respective opposite sides of this diaphragm 234 a pair of chambers 240 and 241.

Opening into the chamber 240 is one end of a passageway 242 that extends through the casing sections 83 and 84 and at its other end, as shown in FIG. 3A, opens into the hereinbefore-mentioned passageway 120.

Opening into the chamber 241 (FIG. 3B) is one end of a short passageway 243 that extends through the casing section 84 and at its other end opens into the hereinbefore-mentioned passageway 195.

As shown in FIG. 3B, a piston rod 244 that is slidably mounted in the bore 100 has a collar 245 formed thereon to enable a cup-shaped piston 246 that is slidable in the counterbore 99 to be operatively connected to this piston rod 244 by a snap ring 247. A spring 248 interposed between the piston 246 and the insect excluder device 96 biases the collar 245 against a stop 249 formed on the casing section 84 at the lower end of the bore 100. This spring 248 is stronger than the spring 226. Accordingly, these two springs 226 and 248 bias the diaphragm 224, diaphragm follower plates 237 and 239, stems 234 and 244 and hollow cylindrical exhaust valve seat member 227 to the position shown in FIG. 3B in which the upper end of the piston rod 244 abuts the nut 238, the out-turned flange 228 is disposed above the upper end of the bushing 231, and the collar 245 abuts the stop 249.

A third spring 250 that is interposed between the diaphragm follower plate 191 and the upper end of the counterbore 212 is effective to bias the diaphragm 184, diaphragm follower plates 191 and 189, and stem 185 to the position shown in FIG. 3B, it being understood that the spring 248 is stronger than the two springs 250 and 226 combined.

As shown in FIG. 3B, the piston rod 244 intermediate its ends is provided with a peripheral annular groove in which is disposed an O-ring seal 251 that forms a seal with the wall surface of the bore 100 to prevent leakage of fluid under pressure from the chamber 241 to the top of the piston 246. This piston 246 is provided with a peripheral annular groove in which is disposed an O-ring seal 252 that forms a seal with the wall surface of the counterbore 99 to prevent leakage of fluid under pressure from the passageway 98 to atmosphere past the shield 95.

Furthermore, an O-ring seal 253 is disposed about the piston rod 244 and interposed between the piston 246 and the snap ring 247 to prevent leakage of fluid under pressure from the top of the piston 246 to atmosphere.

OPERATION

Initial Charging

Let it be assumed that the leg 2 (FIG. 1) of the pipe bracket 1 is secured to the body of a railway freight car so that this car is provided with the novel brake control valve device 6 (FIGS. 1A and 1B) and brake cylinder device 7 (FIG. 2) that constitute the present invention.

Furthermore, assume that this freight car has been coupled into a train of cars, and that a handle of an engineer's brake valve device (not shown) located on the locomotive coupled to the head end of the train is in its release position. Therefore, while the handle of the brake valve device is in its release position, this brake valve device will effect the supply of fluid under pressure to the train brake pipe and, therefore, to the brake pipe 150 (FIG. 1) to charge the train brake pipe to a preselected normal charged value which, for example, may be seventy pounds per square inch.

Fluid under pressure thus supplied to the brake pipe 150 will flow via passageway 157, passageway 156 (FIG. 3A) and passageway 179 to the interior of the counterbore 169.

Since the resilient disc 166 of poppet valve 105 is unseated from valve seat 113''' by the spring 172 thus opening charging valve 165, fluid under pressure will flow from the interior of the counterbore 169 to the passageway 178 via the hollow valve seat member 171, counterbore 170 and choke 175 at a rate determined by the size of this choke 175.

Fluid under pressure supplied to the passageway 178 will flow to: (1) the chamber 41 (FIG. 2) in the brake cylinder device 7 via passageways 119 and 80, (2) the chamber 32 in this brake cylinder device 7 via passageway 119 (FIG. 3A), counterbore 115, hollow valve seat member 112, past valve seat 113, since disc 109 of valve 101 is unseated therefrom by spring 110, counterbore 106, and passageways 120, 121 (FIG. 1) and 77 (FIG. 2), (3) the chamber 63 in brake cylinder device 7 via passageways 119 (FIG. 3A) and 135, counterbore 130, hollow valve seat member 127, past valve seat 113', since disc 125 of valve 102 is unseated therefrom by spring 128, counterbore 122, and passageways 136 and 79 (FIG. 2), (4) groove 148 (FIG. 3A) on valve stem 141 of valve 103, which is seated on seat 139 by spring 138, via passageway 147, (5) chamber 192 (FIG. 3B) via passageways 147 and 194, and (6) chamber 201 via passageways 147 and 202.

Furthermore, some of the fluid under pressure that is supplied from the brake pipe 150 to the passageway 156 (FIG. 3A) flows therefrom to: (1) groove 153' on valve stem 153 of valve 104 which is seated on seat 155 by spring 164, (2) chamber 193 (FIG. 3B) via passageway 195, and (3) chamber 241 via passageways 195 and 243.

Moreover, it will be noted from FIGS. 3A and 3B that some of the fluid under pressure supplied to the passageway 120 flows to the chamber 240 via the passageway 242.

From the foregoing, it is apparent that the chambers 41 (FIG. 2), 32 and 63 in the brake cylinder device 7, the chambers 192 and 193 (FIG. 3B) on the respective opposite sides of the diaphragm 184 and the chambers 240 and 241 on the respective opposite sides of the diaphragm 224 are all charged to the normal charged value of the train brake pipe which may be, as hereinbefore stated, seventy pounds per square inch.

With the chambers 191, 193, 240 and 241 all charged to the pressure carried in the train brake pipe, the springs 250, 226 and 248 are effective to shift the diaphragms 184 and 224, stems 185 and 234, exhaust valve seat member 227, piston rod 244 and piston 246 to the position shown in FIG. 3B.

It will be noted from FIGS. 1, 2, 3A and 3B that the chamber 62 in the brake cylinder device 7 is open to atmosphere via passageways 81 and 149, counterbore 144, hollow cylindrical valve seat member 137, counterbore 145, passageways 146 and 133, chamber 92, passageway 94, lower end of counterbore 99 and past shield 95 of the insect excluder device 96.

Therefore, with the chambers 41, 32 and 63 charged to the pressure carried in the train brake pipe and the chamber 62 open to atmosphere, the brake release spring 74 is effective to shift the pistons 15 and 59 to the brake release position in which they are shown in FIG. 2. While in this position, the cup-shaped nut 67 abuts the end of the annular boss 75 on the right-hand end of the brake cylinder body 50.

Brake Application

A brake application is initiated by effecting a reduction of the pressure in the brake pipe 150 (FIG. 1) by the engineer moving the handle of the engineer's brake valve device on the locomotive to a chosen position in its application zone in the usual well-known manner.

As the pressure in the brake pipe 150 is reduced, the pressure in the chamber 193 (FIG. 3B) below the diaphragm 184 and in the chamber 241 below the diaphragm 224 will be correspondingly reduced.

Since fluid under pressure cannot flow from the chambers 192 and 240 to the brake pipe 150 via the choke 175 in the check valve 174 as fast as fluid under pressure is flowing from the chambers 193 and 241 to the brake pipe 150 via passageways 243, 195, 156 and 157 (FIG. 1) in which there are no chokes, it is apparent that a differential fluid pressure force is quickly established that acts in a downward direction to deflect diaphragms 184 (FIG. 3B) and 224 downward and thereby effect shifting of diaphragm follower plates 189, 191, 237 and 239 downward.

As the diaphragm follower plate 189 is thus shifted downward, it will first abut the upper end of valve stem 204 of valve 203 and thereafter shift this stem downward to unseat annular member 207 of this valve 203 from its seat 197.

Upon the unseating of annular member 207 of valve 203 from its seat 197, fluid under pressure will flow from the chamber 41 (FIG. 2) in the brake cylinder device 7 to the chamber 93 (FIG. 3A) above diaphragm 85 via passageway 80 (FIGS. 1 and 2), passageways 119, 147 and 202 (FIGS. 3A and 3B), chamber 201, past valve seat 197, bore 196 and passageways 209 and 98.

Some of the fluid under pressure supplied to the passageway 98 flows to the upper side of the cup-shaped piston 246 to shift this piston and the piston rod 244 downward against the yielding resistance of the spring 248 so that the upward bias of this spring 248 is removed from the diaphragms 184 and 244.

Moreover, fluid under pressure will flow from the chamber 192 to the chamber 93 via passageways 194, 147 and 202, and the pathway described above.

Fluid under pressure thus supplied to the chamber 93 establishes a fluid pressure force which will deflect the diaphragm 85 downward against the yielding resistance of the spring 180.

As the diaphragm 85 is thus deflected downward, the diaphragm follower plates 87 and 88 are shifted downward whereupon the follower plate 87 will first abut the upper end of the valve stems 108, 124, 141, 153 and 167 and thereafter shift these stems downward simultaneously.

As the stem 108 is thus shifted downward, the valve 101 and disc 109 are shifted downward against the yielding resistance of the spring 110 to effect seating of this disc 109 on the valve seat 113 to thereby close communication between chambers 41 (FIG. 2) and 32 in the brake cylinder device 7.

As the valve stem 124 is thus shifted downward, the valve 102 together with disc 125 and resilient member 126 bonded thereto are shifted downward against the yielding resistance of the spring 128 to first unseat member 126 from valve seat 132 and thereafter seat disc 125 on valve seat 113'.

The seating of the disc 125 on the valve seat 113' closes communication between the chambers 41 and 63 (FIG. 2) in the brake cylinder device 7.

Upon the unseating of the member 126 (FIG. 3A) from the seat 132, the fluid under pressure in the chamber 63 (FIG. 2) is vented to atmosphere via passageway 79 (FIG. 2), passageway 136 (FIGS. 1 and 3A), counterbore 122, past valve seat 132, bore 123, passageway 133, chamber 92, passageway 94 (FIG. 3B), lower end of counterbore 99 and past shield 95 of insect excluder device 96.

As the valve stem 141 is shifted downward, the valve 103 together with disc 125' and member 126' bonded thereto are shifted downward against the yielding resistance of spring 138 to first unseat member 126' from valve seat 139 and thereafter seat disc 125' on valve seat 113''.

The seating of the disc 125' on the seat 113'' closes communication between the chamber 62 (FIG. 2) in the brake cylinder device 7 and atmosphere.

Upon the unseating of the member 126' from the seat 139, fluid under pressure will flow from the chamber 41 (FIG. 2) to the chamber 62 in the brake cylinder device 7 via the passageway 80 (FIGS. 1 and 2), passageway 119 (FIG. 3A), passageway 147 (FIGS. 3A and 3B), bore 140, past valve seat 139, counterbore 144, passageway 149 and passageway 81 (FIG. 1).

As the valve stem 153 (FIG. 3A) is shifted downward, the valve 104 and member 154 bonded thereto are shifted downward against the yielding resistance of the spring 164 and away from the valve seat 155, whereupon fluid under pressure will flow from the brake pipe 150 (FIG. 1) to the chamber 62 (FIG. 2) via passageway 157 (FIG. 1), passageway 156 (FIG. 3A), bore 152, past valve seat 155, counterbore 151, past check valve 159 which is unseated from its seat 158 against the yielding resistance of the spring 160 by the fluid under pressure supplied to the counterbore 151, counterbore 161, choke 162, passageways 163 and 149, and passageway 81 (FIGS. 1 and 2).

As the valve stem 167 (FIG. 3A) is shifted downward, the charging valve 165 and disc 166 bonded thereto are shifted downward against the yielding resistance of the spring 172 to effect seating of the disc 166 on the valve seat 113'''.

This seating of disc 166 on valve seat 113''' prevents back flow from the chamber 41 (FIG. 2) in the brake cylinder device 7 and chamber 192 (FIG. 3B) in the brake control valve device 6 to the brake pipe 150 (FIG. 1) from which brake pipe fluid under pressure is being released to atmosphere via the engineer's brake valve device on the locomotive.

Fluid under pressure will now flow from the chambers 41 and 32 (FIG. 2) in the brake cylinder device 7 and from the brake pipe 150 (FIG. 1) to the chamber 62 (FIG. 2) until equalization of the pressures in these chambers occurs. The equalization pressure thus obtained can be best illustrated by way of a specific example.

Accordingly, it will be assumed that:

(1) The diameter of piston 59 is 3.625 inches.

(2) The diameter of piston 15 is 14.0 inches.

(3) The diameter of piston rod 64 is 1.0 inches.

(4) The diameter of hollow rod 34 is 3.0 inches.

(5) The pistons 59 and 15 are shifted in the direction of the right hand, as viewed in FIG. 2, a distance of 4.0 inches by the fluid under pressure supplied to the chamber 62 at the left-hand side of the piston 59 in order to, via the brake rigging (not shown), bring the braking surfaces of the brake shoes (not shown) into braking contact with the tread surface of the wheels of the vehicle. Therefore, the increase in volume of the chamber 62 may be calculated as follows:

Area of a 3.625 inch diameter piston=

$$(3.1416\times(3.625)^2)/4=10.321 \text{ square inches}$$

Then increase in volume of chamber 62=10.321 square inches×4 inches=41.284 cubic inches.

(6) The volume of chamber 41 is 320 cubic inches, while the pistons 15 and 59 occupy the release position shown in FIG. 2.

(7) The volume of chamber 32 is 880 cubic inches, while the pistons 15 and 59 occupy the release position shown in FIG. 2.

(8) The volume of chamber 62 (while piston 59 occupies the position shown in FIG. 2) and the passageways 81 and 149 is 10 cubic inches.

(9) A volume of fluid under pressure equal to the volume of a 1¼ inch diameter pipe 50 feet long flows from the brake pipe 150 (FIG. 1) past the check valve 159 (FIG. 3A) and through the choke 162 to the chamber 62 (FIG. 2). It can be shown mathematically that the volume of fluid under pressure in this 50 feet of brake pipe is 736.32 cubic inches.

(10) The pressure in the brake pipe 150 (FIG. 1) when fully charged is 70 pounds per square inch gage or 84.7 pounds per square inch absolute pressure.

It should be noted that when fluid under pressure flows from the chamber 41 (FIG. 2) to the chamber 62, this reduces the pressure in the chamber 41 whereupon the one-way valve 42 will be unseated from the annular bead 39 so that fluid under pressure will flow from the chamber 32 to the chamber 41. Therefore, the fluid under pressure from both of these chambers 32 and 41 will equalize into the chamber 62. Accordingly, the combined volume of these two chambers 41 and 32 that equalize into the chamber 62 is 320 cubic inches plus 880 cubic inches which is a total of 1200 cubic inches.

Now, if the equalization pressure be denoted by $P_2$, then this pressure can be calculated from the following mathematical equation:

$$1200 \text{ cubic inches}\times 84.7 \text{ pounds per square inch}+736.32 \text{ cubic inches}\times 84.7 \text{ pounds per square inch}+10 \text{ cubic inches}\times 14.7 \text{ pounds per square inch}=1200 \text{ cubic inches}\times P_2+736.32 \text{ cubic inches}\times P_2+10 \text{ cubic inches}\times P_2+41.284 \text{ cubic inches}\times P_2.$$

Then:

$P_2$=82.5 pounds per square inch absolute pressure, or $P_2$=82.5−14.7=67.8 pounds per square inch gage.

Now, to calculate the braking force for pressing the brake shoes against the tread surface of the wheels, assume that:

(1) Ratio of the brake rigging is 2.

(2) The strength of release spring 74 after the piston 15 moves 4 inches in the direction of the right hand is 400 pounds.

Then:

(a) 10.321 square inches×67.8 pounds per square inch=700 pounds=Force acting in the direction of the right hand on the left-hand side of piston 59 (FIG. 2).

(b) The diameter of the piston 15 is 14.0 inches, as hereinbefore stated. Therefore, the area of a 14.0 diameter piston is: $(3.1416\times(14)^2)/4=153.94$ square inches. The diameter of piston rod 64 is 1.0 inch, as hereinbefore stated. Therefore, the area of a 1 inch diameter piston rod is $(3.1416\times(1)^2)/4=0.7854$ square inch.

Then:

153.94 square inches−0.7854 square inches=152.1546 square inches=Area of piston 15 that is subject to the pressure of the fluid in chamber 41 (FIG. 2).

Then:

152.1546 square inches×67.8 pounds per square inch=10,320 pounds=Force acting in the direction of the right hand on the left-hand side of the piston 15 (FIG. 2).

(c) The diameter of the hollow rod 34 is 3.0 inches. Therefore, the area of a 3.0 inch rod is:

$$(3.1416\times(3)^2)/4=7.0686 \text{ square inches.}$$

Then:

153.94 square inches−7.0686 square inches=146.8714 square inches=Area of piston 15 that is subject to the pressure of the fluid in chamber 32 (FIG. 2).

Therefore:

146.8714 square inches × 67.8 pounds per square inch = 9,950 pounds = Force acting in the direction of the left hand on the right-hand side of piston 15.

Accordingly, the net force acting in the direction of the right hand on pistons 59 and 15 is:

700 pounds + 10,320 pounds − 9,950 pounds − 400 pounds = 670 pounds.

Since it has been assumed that the braking ratio is 2, then, the force pressing the brake shoes against the tread surface of the wheels of the vehicle is:

670 pounds × 2 = 1,340 pounds.

From the foregoing, it is apparent that subsequent to movement of the pistons 59 (FIG. 2) and 15 a distance of 4 inches and equalization of the pressure of the fluid in the chambers 32 and 41 into the chamber 62 at the above-mentioned pressure of 67.8 pounds per square inch, and also the equalization of the pressure of the fluid in the assumed 50 feet of train brake pipe into this chamber 62, the force pressing the brake shoes against the tread surface of the vehicle wheels is 1,340 pounds.

As the piston 15 moves 4 inches in the direction of the right hand from the position shown in FIG. 2, the decrease in the volume of the chamber 32 may be calculated as follows:

146.8714 square inches × 4 inches = 587.4856 cubic inches.

Therefore, the volume of chamber 32 subsequent to the pistons 59 and 15 moving in the direction of the right hand, as viewed in FIG. 3, a distance of 4 inches is:

880.0 cubic inches − 587.4856 cubic inches = 292.5144 cubic inches.

Moreover, the pressure in the chambers 41, 32 and 62 in the brake cylinder device 7 (FIG. 2) is now the equalized pressure of 67.8 pounds per square inch gage.

Since the handle of the engineer's brake valve device on the locomotive has been moved to a position in its application zone, the relay valve device of this brake valve device, which may be the same as that shown and described in U.S. Pat. No. 2,958,561, issued Nov. 1, 1960 to Harry C. May, and assigned to the assignee of the present application, will continue to vent fluid under pressure from the brake pipe 150 (FIG. 1) to atmosphere.

As fluid under pressure is thus released from the brake pipe 150 (FIG. 1) to atmosphere to effect a reduction of the pressure of the fluid therein, a corresponding reduction of the pressure of the fluid in the chambers 193 and 241 (FIG. 3B) in the brake control valve device 6 will continue.

Consequently, it is apparent from FIG. 3B that as the pressure of the fluid in the chambers 193 and 241 continues to be reduced, the pressure of the fluid in the chambers 192 and 240, which pressure is the hereinbefore-mentioned equalized pressure of 67.8 pounds per square inch gage, will continue to deflect the diaphragms 184 and 224 downward so that as the valve stems 185, 234 and 204 are simultaneously shifted downward thereby, the spring 226 is rendered effective to simultaneously shift exhaust valve seat member 227 downward until the out-turned flange 228 integral therewith abuts a stop 254 formed by the upper end of the bushing 231.

Subsequent to the movement of the flange 228 into abutting engagement with the stop 254, the continued downward shifting of the valve stems 185, 204 and 234 by the diaphragms 184 and 224 will unseat the resilient annular member 233 that is bonded to the upper end of the fluted valve stem 234 from the exhaust valve seat 229 at the lower end of the exhaust valve seat member 227.

When annular member 233 is thus unseated from the exhaust valve seat 229, fluid under pressure will flow from the chamber 32 (FIG. 2) in the brake cylinder device 7 and the chamber 240 (FIG. 3B) in the brake control valve device 6 to atmosphere via passageway 77 (FIG. 2), passageway 121 (FIGS. 1 and 2), passageways 120 and 242 (FIGS. 3A and 3B), chamber 240 above diaphragm 224 (FIG. 3B), between the interior of bushing 231 and the fluted stem 234, groove 232 in this bushing 231, past valve seat 229, between the interior of exhaust valve seat member 227 and the fluted portion of stem 185, counterbore 225, passageway 235, lower end of counterbore 99 and past shield 95 of insect excluder device 96.

Fluid under pressure will thus flow from the chamber 32 (FIG. 2) and chamber 240 (FIG. 3B) to atmosphere until the self-lapping relay valve device of the engineer's brake valve device on the locomotive reduces the pressure of the fluid in the brake pipe 150 (FIG. 1) and the chambers 193 and 241 (FIG. 3B) to a value corresponding to the position in its application zone to which the handle of this brake valve device has been moved by the engineer.

Upon the self-lapping relay valve device of the engineer's brake valve device terminating the release of fluid under pressure from the brake pipe 150 (FIG. 1) and chambers 241 and 193 (FIG. 3B), the continued flow of fluid under pressure from the chamber 32 (FIG. 2) in the brake cylinder device 7 and the chamber 240 (FIG. 3B) in the brake control valve device 6 to atmosphere will establish a differential fluid pressure force which acts in an upward direction on the diaphragm 224.

Accordingly, as this differential fluid pressure force acting in an upward direction on the diaphragm 224 increases, it will deflect this diaphragm 224 upward to shift the fluted stems 234 and 185 upward until the annular member 233 abuts the exhaust valve seat 229 thereby terminating the release of fluid under pressure from the chamber 32 (FIG. 2) and chamber 240 (FIG. 3B).

As the stem 185 is thus shifted upward, it will shift the diaphragm follower plates 189 and 191 upward. As the diaphragm follower plate 189 is thus shifted upward, the spring 208 is rendered effective to shift valve 203, valve stem 204 and annular member 207 upward toward the valve seat 197. It should be noted, however, that the length of the valve stems 185, 204 and 234 are such that the annular member 233 is shifted upward into abutting relationship with the exhaust valve seat 229 before the annular member 207 bonded to the valve 203 is seated on the valve seat 197 by the spring 208. Consequently, the supply of fluid under pressure from the chamber 192 (FIG. 3B) and chamber 41 (FIG. 2) to the chamber N&42IG. 3A) is maintained so that the diaphragm 85 is effective via diaphragm follower plate 87 and valve stems 108, 124, 141, 152 and 167 to hold the valves 101, 102, 103, 104 and 105 in their lower position.

From the foregoing, it is apparent that subsequent to the pistons 59 (FIG. 2) and 15 shifting the above-mentioned assumed distance of 4.0 inches to bring the braking surface of the brake shoes into braking contact with the tread surface of the vehicle wheels and press these shoes against the thread surface of these wheels with the afore-stated force of 1,340 pounds, the brake control valve device 6 is operative in response to the continued release of fluid under pressure from the train brake pipe by the relay valve device of the engineer's brake valve device on the locomotive to release fluid under pressure from the chamber 32 (FIG. 2) to atmosphere to further increase the force pressing the brake shoes against the tread surface of the vehicle wheels.

Accordingly, let it be assumed that the engineer on the locomotive moved the handle of the engineer's brake valve device to its full service position. Upon movement of this handle to its full service position, the relay valve device of this engineer's brake valve device will operate to release fluid under pressure from the brake pipe 150 (FIG. 1) and the chambers 193 and 241 (FIG. 3B) to atmosphere, in the manner explained in the above-mentioned U.S. Pat. No. 2,958,561, until the pressure in this pipe and these chambers is reduced to 50 pounds per square inch.

When the pressure in the chambers 193 and 240 is reduced to 50 pounds per square inch, the brake control valve device 6 operates in response thereto to release fluid under pressure from the chamber 240 in this brake control valve device 6 and the chamber 32 (FIG. 2) in the brake cylinder device 7 to atmosphere until the pressure in these chambers 240 and 32 is correspondingly reduced to 50 pounds per square inch.

It will be noted that the one-way valve device 42 (FIG. 2) prevents flow from the chamber 41 to the chamber 32. Consequently, the pressure in the chamber 41 (FIG. 2) and chamber 192 (FIG. 3B) remains at the afore-mentioned equalized pressure of 67.8 pounds per square inch.

In order that a freight car provided with the novel brake control valve device 6 and the novel brake cylinder device 7, that constitute the present invention, operates satisfactorily in a train of cars, one or more of which cars are provided with the brake equipment disclosed in hereinbefore-mentioned U.S. Pat. Nos. 3,175,869 and 3,183,795, let it now be assumed that:

(1) The effective area of the diaphragm 224 is one square inch, and that:

(2) The effective area of the diaphragm 184 is 1.8 square inches, since it can be shown mathematically that if the diaphragms 224 and 184 have these effective areas, the brake cylinder device 7, the pistons 59 and 15 of which have a diameter of 3.625 inches and 14.0 inches, respectively, will provide for any given service reduction of pressure in the train brake pipe and, therefore, the pipe 150, the same braking force for this freight car as those cars provided with a brake cylinder of the type disclosed in U.S. Pat. No. 3,183,795, the piston of which has a diameter of 10 inches.

Then the pressure in the chamber 240, and also in the chamber 32 (FIG. 2) when the brake control valve device 6 moves to lap position to cut off the release of fluid under pressure from this chamber 240 (FIG. 3B) and the chamber 32 (FIG. 2) in the brake cylinder device 7 to atmosphere may be calculated as follows:

67.8 pounds per square inch × 1.8 square inches + $P_{240}$ × 1 square inch = 50 pounds per square inch × 1.8 square inches + 50 pounds per square inch × 1 sq. in.

Then:

$P_{240}$ = 17.96 pounds per square inch.

The force to press the brake shoes against the tread surface of the wheels when the pressure in the chamber 240 (FIG. 3B) and chamber 32 (FIG. 2) has been reduced to 17.96 pounds per square inch may be calculated as follows:

The fluid pressure force acting in the direction of the right hand on the left-hand side of the piston 59 (FIG. 2) remains 700 pounds.

The fluid pressure force acting in the direction of the right hand on the left-hand side of the piston 15 remains 10,320 pounds.

The force of the spring 74 acting in the direction of the left hand on the right-hand side of the piston 15 remains 400 pounds.

The fluid pressure force acting in the direction of the left hand on the right-hand side of the piston 15 is:

146.8714 square inches × 17.96 pounds per square inch = 2,637.61 pounds.

Therefore, the net force acting in the direction of the right hand on the pistons 59 and 15 is:

700 pounds + 10,320 pounds − 2,637.61 pounds − 400 pounds = 7,982.39 pounds.

Since the braking ratio has been assumed to be 2, the force pressing the brake shoes against the tread surface of the wheels of the vehicle is:

7,982.39 pounds × 2 = 15,964.78 pounds.

The brake apparatus disclosed in the above-mentioned U.S. Pat. No. 3,175,869 when installed on railway freight cars includes a brake cylinder device of the type shown in U.S. Pat. No. 3,183,795. This brake cylinder device has therein a piston having a diameter of 10 inches and an area of 78.54 square inches which is subject to fluid at a pressure of 50 pounds per square inch when a full service brake application is effected. Therefore, the fluid pressure force exerted by this piston is:

78.54 square inches × 50 pounds per square inch = 3,927 pounds.

Then, assuming a braking ratio of 2, the force pressing the brake shoes against the tread surface of the wheels of the vehicle is:

3,927 pounds × 2 = 7,854 pounds of force.

Therefore, the advantage of the brake apparatus constituting the present invention over the brake apparatus disclosed in U.S. Pat. No. 3,175,869 is readily apparent since when the pistons 15 and 59 of the brake cylinder device 7 of the present invention have a diameter of 3.625 inches and 14.0 inches, respectively, a braking force of 15,964.78 pounds is provided whereas when the piston of the brake cylinder disclosed in U.S. Pat. No. 3,183,795 has a diameter of 10.0 inches, only 7,854 pounds of braking force is provided. Thus, when the diameter of the piston 15 is only 2.00 inches greater than the diameter of the piston of the brake cylinder presently used on most railway freight cars, approximately twice as much braking force is provided when the braking ratio in each case is 2.

Moreover, the brake apparatus constituting the present invention requires no separate fluid pressure storage reservoir since the fluid under pressure for effecting a brake application is stored within the brake cylinder device 7.

Furthermore, it can be shown mathematically that the volume of fluid under pressure release from the chamber 32 (FIG. 2) in the brake cylinder device 7 to atmosphere when effecting the above-described brake application is considerably less than the volume of fluid under pressure released from the above-mentioned brake cylinder device that has a piston having a diameter of 10 inches.

Accordingly, the volume of the fluid under pressure released from the chamber 32 (FIG. 2) to atmosphere when the pressure in this chamber is reduced from the equalized pressure of 67.8 pounds per square inch gage to a pressure of 17.8 pounds per square inch gage may be calculated as follows:

$$P_1 \times V_1 = P_2 \times V_2 \times V_3 \text{ where:}$$

$P_1$ = Original pressure (82.5 pounds per square inch absolute) in chamber 32.

$V_1$ and $V_2$ = Volume (292.5144 cubic inches) of chamber 32.

$P_2$ = Final pressure (32.66 pounds per square inch absolute) in chamber 32.

$P_3$ = Atmospheric pressure (14.7 pounds per square inch absolute) of fluid release from chamber 32 to atmosphere.

$V_3$ = Volume (in cubic inches) of fluid under pressure released from chamber 32 to atmosphere when pressure in this chamber 32 is reduced to 32.66 pounds per square inch absolute.

Then:

82.5 pounds per square inch × 292.5144 cubic inches =

32.66 pounds per square inch × 292.5144 cubic inches +

14.7 pounds per square inch × $V_3$ $V_3$ = 992.03 cubic inches.

The above-mentioned 10 inch diameter piston of a conventional brake cylinder device has a stroke of 10 inches. Therefore, the volume of the fluid under pressure in this brake cylinder device when a brake application is in effect is:

$$(3.1416 \times (10)^2)/4 \times 10 \text{ inch} = 785.40 \text{ cubic inches.}$$

The pressure in this brake cylinder device when a full service brake application is in effect is 64.7 pounds per square inch absolute.

Since all of this fluid under pressure is released to atmosphere when a brake release is effected, the absolute pressure of this fluid released to atmosphere is 14.7 pounds per square inch absolute.

Then:

785.40 square inches × 64.7 pounds per square inch = V × 14.7 pounds per square inch.

V = 3,456.8 cubic inches = Volume of fluid released from a conventional brake cylinder device to atmosphere when a brake release is effected.

This volume of 3,456.8 cubic inches is approximately 3.4 times the volume of 992.03 cubic inches released from the chamber 32 in the brake cylinder device 7. Accordingly, the novel brake cylinder device 7 is much more economical in the use of fluid under pressure than the conventional brake cylinder device presently used on most railway freight cars.

In view of the foregoing, the superiority of the brake apparatus constituting the present invention over the brake apparatus disclosed in the above-mentioned U.S. Pat. Nos. 3,175,869 and 3,183,795 is readily apparent.

Release of a Brake Application

To effect a release of brakes after effecting a brake application in the manner described above, the engineer will move the handle of the engineer's brake valve device on the locomotive from the position it occupies in its application zone back to its release position, whereupon the relay valve device of this brake valve device will effect the supply of fluid under pressure to the brake pipe 150 (FIG. 1). Fluid under pressure thus supplied to the brake pipe 150 flows therefrom to the chambers 193 (FIG. 3B) and 241 via passageways 157, 156, 195 and 243.

Upon the supply of fluid under pressure to the chambers 193 and 241 increasing the pressure therein to a value greater than the respective pressures of the fluid present in the chambers 192 and 240, the diaphragms 184 and 224 will be deflected upward to cause upward shifting of the valve stems 185 and 234, annular member 233, exhaust valve seat member 227 and diaphragm follower plates 189, 191, 237 and 239.

As the follower plate 189 is thus shifted upward, the spring 208 is rendered effective to shift valve 203, annular member 207 and stem 204 upward until annular member 207 is seated on valve seat 197 to close communication between chambers 41 (FIG. 2) and 192 (FIG. 3B) and the chamber 93 (FIG. 3A).

As the valve stem 185 (FIG. 3B) is thus shifted upward, it will shift cylindrical valve member 213 upward to unseat annular member 220 from valve seat 217.

When annular member 220 is thus unseated from valve seat 217, fluid under pressure will flow from the chamber 93 (FIG. 3A) above diaphragm 85 to atmosphere via passageways 98 and 219 (FIG. 3B), port 218, groove 223 on valve member 213, past valve seat 217, counterbore 211, passageways 221 and 94, lower end of counterbore 99 and past shield 95 of insect excluder device 96.

Moreover, fluid under pressure will flow from the upper side of the piston 246 to atmosphere via the passageway 98 and the pathway described above thereby rendering the spring 248 effective to shift the upper end of the piston rod 244 into contact with the nut 238 so that the spring 248 is thereafter effective to assist in shifting the diaphragms 184 and 224 upward and thereby move the annular member 220 further away from the valve seat 217 which increases the rate of flow of fluid under pressure from the chamber 93 to atmosphere via the pathway described above.

As fluid under pressure is thus vented from the chamber 93 (FIG. 3A) to atmosphere, the spring 180 is rendered effective to shift the diaphragm follower plates 87 and 88 upward away from the valve stems 108, 124, 141, 153 and 167.

The valves 101, 102, 103, 104 and 105 will now be shifted upward by the respective springs 110, 128, 138 and 164 to the position in which these valves are shown in FIG. 3A.

Upon the return of the valve 101 to the position shown in FIG. 3A, a communication is established between the chamber 41 (FIG. 2) and 32 in the brake cylinder device 7.

The return of the valve 102 to the position shown in FIG. 3A disconnects the chamber 63 (FIG. 2) from atmosphere and connects this chamber 63 to the chamber 41.

The return of the valve 103 to the position shown in FIG. 3A disconnects the chamber 62 (FIG. 2) from the chamber 41 and establishes a communication between this chamber 62 and atmosphere so that all fluid under pressure present in this chamber 62 is vented to atmosphere.

The return of the valve 104 to the position shown in FIG. 3A prevents flow from the brake pipe 150 (FIG. 1) to the chamber 62 which is now open to atmosphere, as explained above.

When the charging valve 165 is returned to the position shown in FIG. 3A, the fluid in the chamber 41 (FIG. 2) and chamber 192 (FIG. 3B) is at the hereinbefore-mentioned equalized pressure of 67.8 pounds per square inch gage which is higher than the pressure in the brake pipe 150 (FIG. 1) which is now 50 pounds per square inch gage, as hereinbefore stated.

Consequently, this higher pressure acting on the lower side of the check valve 174 within the annular valve seat 176 will lift the check valve 174 upward from this seat 176 against the yielding resistance of the spring 173.

When the check valve 174 is thus unseated from its seat 176, fluid under pressure in the chamber 41 (FIG. 2) and chamber 192 (FIG. 3B) will flow to the brake pipe 150 (FIG. 1) via passageways 80 (FIG. 1), 119 (FIG. 3A) and 178, past valve seat 176, counterbore 170, hollow valve seat member 171, past valve seat 113''', counterbore 169, and passageways 179, 156 and 157 (FIG. 1) until equalization occurs. This flow to the brake pipe 150 hastens the charging thereof and constitutes an accelerated brake release feature.

Subsequent to the above-mentioned equalization, fluid under pressure supplied to the brake pipe 150 (FIG. 1) by the relay valve of the brake valve device on the locomotive will flow to the chambers 193 (FIG. 3A) and 241 via passageway 157 (FIG. 1) and passageways 156, 195 and 243 (FIGS. 3A and 3B), and to the chamber 41 (FIG. 2) via passageways 157 (FIG. 1), 156 (FIG. 3A) and 179, counterbore 169, hollow valve seat member 171, counterbore 170, choke 175 in check valve 174, and passageways 178, 119 and 80 (FIG. 1).

Furthermore, fluid under pressure will flow from the passageway 119 to the chamber 32 (FIG. 2) via counterbore 115 (FIG. 3A), hollow valve seat member 112, counterbore 106 and passageways 120, 121 (FIG. 1) and 77 (FIG. 2), and also to the chamber 192 (FIG. 3B) via passageways 147 and 194.

It will be noted that some of the fluid under pressure supplied to the passageway 120 will flow therefrom to the chamber 240 above the diaphragm 224 via the passageway 242.

When the chambers 192, 193, 240 and 241 are all charged to the normal pressure carried in the brake pipe 150 (FIG. 1), the springs 214 (FIG. 3B), 226 and 248 will return the diaphragms 184 and 224, the diaphragm follower plates 189, 191, 237 and 239, the valve stems 185 and 234, the valve member 213, the exhaust valve seat member 227, the piston 246 and piston rod 244, to the position shown in FIG. 3B in which the annular member 220 is seated on valve seat 217 and exhaust valve seat 229 is seated on annular member 233 so that chamber 93 (FIG. 3A) and chamber 240 (FIG. 3B) are cut off from atmosphere.

With fluid under pressure vented from the chamber 62 (FIG. 2) to atmosphere and supplied to the chambers 41, 63 and 32 from the brake pipe 150 (FIG. 1), the release spring 74 (FIG. 2) is rendered effective to return the piston 59 and 15 in the brake cylinder device 7 to the position shown in FIG. 2 thereby releasing the brakes on the vehicle.

It should be noted that as the piston 15 is returned by the spring 74 to the position shown in FIG. 2, the check valve device 42 prevents flow of fluid under pressure from the chamber 41 to the chamber 32 which is charged with fluid under pressure from the brake pipe 150 (FIG. 1) in the manner explained above.

The various elements of the brake control valve device 6 and the brake cylinder device 7 now occupy the position in which they are shown in the drawings and the brakes on the vehicle are released.

Furthermore, the chambers 32, 41 and 63 in the brake cylinder device 7 (FIG. 2) are charged to the normal fully charged pressure carried in the brake pipe 150 (FIG. 1) and all fluid under pressure is vented from the chamber 62 (FIG. 2) in this brake cylinder device 7.

While one specific example of the diameters of the pistons 59 and 15 in the novel brake cylinder device 7 has been given by way of illustration, it should be noted that the braking force provided by this novel brake cylinder device may be increased or decreased accordingly as the diameter of one or both of these pistons is increased or decreased.

Having now described the invention, what I claim as new and desire to secure by Letters Patent, is:

1. A fluid pressure brake apparatus for controlling braking of a vehicle, said brake apparatus comprising:

(a) brake pipe normally charged to a chosen pressure, (b) braking means having:

(i) a pair of fluid motors of unequal size, each having therein a movable abutment operatively connected to the movable abutment in the other fluid motor, said abutments being operative [cojointly] *jointly* to effect a brake application to a degree in accordance with the sum of two differential fluid pressure forces acting in the same direction on *one and the other of* the respective corresponding sides of said abutments, (ii) [a] one-way flow valve [carried by the movable abutment of the larger fluid motor to enable] *means for enabling* flow of fluid under pressure from a first fluid pressure storage reservoir provided in said larger fluid motor at *said* one side of the larger abutment to a second fluid pressure storage reservoir at [the] *said* other side of said larger abutment, and (iii) biasing means acting on said one side of said larger abutment and effective to normally bias both of said abutments to a brake release position, and (c) a brake control valve device having valve means operable in response to charging said brake pipe to said certain chosen pressure to effect the supply of fluid under pressure from said brake pipe to said first and second storage reservoirs [and to one side of the smaller abutment] and the release of fluid under pressure from [the] *said* other side [thereof] *of the smaller abutment*, said valve means being operable in response to a reduction of the pressure in said brake pipe from said chosen pressure to [simultaneously] cause the [release of fluid under pressure from said one side of said smaller abutment, and the] *supply of fluid under pressure from said second storage reservoir to said*

*other side of said smaller abutment and* release of fluid under pressure from said first fluid pressure storage reservoir at said one side of said larger abutment to reduce the pressure therein to a degree corresponding to the degree of reduction of the pressure in said brake pipe whereby fluid under pressure acting on the respective other side of said pair of tandem-arranged abutments establish a fluid pressure braking force corresponding to the sum of the respective differential fluid pressure forces acting on said respective other sides of said pair of tandem-arranged abutments.

2. A fluid pressure brake apparatus, as recited in claim 1, further characterized in that the smaller of said fluid motors is disposed within said larger fluid motor.

3. A fluid pressure brake apparatus, as recited in claim 1, further characterized in that the smaller of said fluid motors is disposed within said second fluid pressure storage reservoir.

4. A fluid pressure brake apparatus, as recited in claim 1, further characterized in that said operatively-connected abutments are arranged in tandem.

5. A fluid pressure brake apparatus, as recited in claim 1, further characterized by a pipe bracket having a pair of parallel spaced-apart faces to one of which is secured said braking means and to the other of which is secured said brake control valve device.

6. A fluid pressure brake apparatus, as recited in claim 1, further characterized in that said brake control valve device comprises:

(a) a movable abutment for effecting operation of said valve means; and (b) an application and release control valve mechanism operatively responsive to a reduction of the pressure in said brake pipe to cause the supply of fluid under pressure from said second fluid pressure storage reservoir to said movable abutment to cause said movable abutment to operate said valve means.

7. A fluid pressure brake apparatus, as recited in claim 1, further characterized in that said brake control valve device comprises:

(a) a movable abutment for effecting operation of said valve means, and (b) an application and release control valve mechanism operatively responsive to a reduction of the pressure in said brake pipe and comprising:

(i) a first valve for effecting the supply of fluid under pressure from said first and second storage reservoirs to said movable abutment for effecting operation of said valve means, (ii) a second valve for effecting a release of fluid under pressure from said first fluid pressure storage reservoir to atmosphere to render the fluid under pressure in said second fluid pressure storage reservoir effective to increase the differential fluid pressure force acting on said other side of said larger abutment, and (iii) a pair of spaced-apart movable abutments for effecting operation of said first and second valves in response to a reduction of pressure in said brake pipe, one of said abutments being subject on its respective opposite sides to the pressure in said second fluid pressure storage reservoir and in said brake pipe, and the other of said abutments being subject on its respective opposite sides to the pressure in said first fluid pressure storage reservoir and in said brake pipe.

8. A fluid pressure brake apparatus, as recited in claim 1, further characterized in that said valve means of said brake control valve device comprises:

(a) a first valve for controlling flow of fluid under pressure from said second fluid pressure storage reservoir to said first fluid pressure storage reservoir, (b) a second valve for controlling flow of fluid under pressure from said second fluid pressure storage reservoir to said one side of said movable abutment of the smaller of said pair of fluid motors and the release of fluid under pressure from said one side to atmosphere, (c) a third valve for controlling flow of fluid under pressure from said other side of said movable abutment of the smaller of said pair of fluid motors to atmosphere and the supply of fluid under pressure from said second fluid pressure storage reservoir to said other side of said movable abutment of the smaller of said pair of fluid motors, (d) a fourth valve for controlling flow of fluid under pressure from said brake pipe to said other side of said movable abutment of the smaller of said pair of fluid motors, and (e) a fifth valve for controlling flow of fluid under pressure from said brake pipe to said fluid pressure storage reservoirs.

9. A fluid pressure brake apparatus, as recited in claim 8, further characterized in that said valve means comprises:

(a) a one-way flow valve disposed between said fourth valve and said other side of said movable abutment of the smaller of said pair of fluid motors to provide for flow of fluid under pressure from said brake pipe to said other side of said movable abutment and prevent backflow of fluid under pressure from said other side to said brake pipe, and (b) a choke so disposed between said one-way flow valve and said other side as to control the rate of flow of fluid under pressure to said other side without restricting the rate of release of fluid under pressure from said other side to atmosphere by said third valve.

10. A fluid pressure brake apparatus, as recited in claim 8, further characterized in that said valve means comprises:

(a) a one-way flow valve disposed between said fifth valve and said second fluid pressure storage reservoir, and (b) a choke for controlling flow of fluid under pressure from said storage reservoirs to said brake pipe whereby said choke and said one-way valve cooperate to provide for a restricted rate of flow of fluid under pressure from said brake pipe to said storage reservoirs while said reservoirs are being charged from said brake pipe to said certain chosen pressure, and an unrestricted rate of flow of fluid under pressure from said storage reservoirs to said brake pipe upon said first and fifth valves establishing a communication through which fluid under pressure may flow from said storage reservoirs to said brake pipe subsequent to a reduction of the pressure in said brake pipe to a value less than the pressures in said storage reservoirs, said flow from said reservoirs to said brake pipe providing an accelerated brake release.

11. A brake cylinder device comprising:

(a) a first hollow cylindrical member, (b) a second hollow cylindrical member coaxially disposed within said first hollow cylindrical member, (c) a first movable abutment disposed within said first hollow cylindrical member and cooperating therewith to form a first and a second fluid pressure chamber on the respective opposite sides of said first movable abutment, (d) a second movable abutment disposed within said second hollow cylindrical member and cooperating therewith to form a first and a second fluid pressure chamber on the respective opposite sides of said second movable abutment, (e) means operably connecting said first and second movable abutments, and (f) a one-way flow valve means to enable flow of fluid under pressure from said first fluid pressure chamber at one side of said first movable abutment to said second fluid pressure chamber at the opposite side thereof upon the shifting of both of said movable abutments in one direction in response to the supply of fluid under pressure to the corresponding second chamber at the other side of said second movable abutment.

12. A brake cylinder device, as recited in claim 11, further comprising:

(a) a pair of pressure heads, (b) means securing said pair of pressure heads to the respective opposite ends of said first hollow cylindrical member, and (c) means securing said second hollow cylindrical member to one of said pressure heads.

13. A brake cylinder device, as recited in claim 11, further characterized in that said one-way flow valve means is carried by said first movable abutment.

14. A brake cylinder device, as recited in claim 11, further characterized in that said first movable abutment is provided with at least one port extending therethrough and with an annular valve seat disposed in surrounding relation to said at least one port, and said one-way flow valve means comprises:

(a) a resilient annular valve member for engaging said annular valve seat, (b) a spring seat so secured to said first movable abutment as to clamp the inner periphery of said annular valve member between said spring seat and said first movable abutment, and (c) biasing means interposed between said spring seat and said annular member for normally biasing said annular valve member into seating contact with said annular valve seat.

15. A brake cylinder device, as recited in claim 11, further characterized by conduit means formed in said first hollow cylindrical member through which fluid under pressure may be supplied to one side of said first movable abutment.

16. A brake cylinder device, as recited in claim 11, further characterized by first conduit means formed in said first hollow cylindrical member through which fluid under pressure may be supplied to one side of said first movable abutment, and by second conduit means formed in said second hollow cylindrical member through which fluid under pressure may be supplied to one side of said second movable abutment.

17. A brake cylinder device, as recited in claim 12, further characterized by first conduit means formed in said first hollow cylindrical member through which fluid under pressure may be supplied to one side of said first movable abutment, and by second conduit means formed in one of said pair of pressure heads through which fluid under pressure may be supplied to the other side of said first movable abutment.

18. A brake cylinder device, as recited in claim 12, further characterized by first conduit means formed in said second hollow cylindrical member through which fluid under pressure may be supplied to one side of said second movable abutment, and by second conduit means formed in one of said pair of pressure heads through which fluid under pressure may be supplied to the other side of said second movable abutment.

19. A brake cylinder device, as recited in claim 14, further characterized in that said means operably connecting said first and second movable abutments comprises a rod removably-connected at one end to said spring seat and at the other end to said second movable abutment.

20. For use with a brake cylinder device having a pair of hollow coaxially-arranged cylindrical members of unequal length in the outer and longer of which is slidably mounted on one side of the smaller a first movable abutment carrying thereon a check valve to provide for flow of fluid under pressure from one side thereof to the other and being operably-connected to a second movable abutment slidably mounted in the inner cylindrical member, and a brake release spring that is interposed between the one side of the first abutment and one of a pair of pressure heads that are secured to the respective opposite ends of the outer cylindrical member whereby this pair of pressure heads cooperate with the outer cylindrical member and the first abutment to form on the respective opposite sides of this first abutment a pair of fluid pressure storage reservoirs, the brake release spring being effective to shift both of the movable abutments to a brake-release position in response to the release of fluid under pressure from one side of the second movable abutment and the supply of fluid under pressure to the other side of this second abutment, a brake control valve device comprising:

(a) fluid pressure operated valve means having one position in which fluid under pressure can flow from a source of fluid under pressure to the other side of the second movable abutment and the pair of fluid pressure storage reservoirs to effect the charging thereof, and shiftable to a second position in which said other side of the second abutment is open to atmosphere, and fluid under pressure flows from both of the storage reservoirs to the one side of the second abutment until equalization of pressure in the storage reservoirs and on said one side of the second abutment occurs, and (b) an application and release control valve mechanism operative to effect the supply of fluid under pressure from one of the pair of storage reservoirs to said fluid-pressure-operated valve means to cause the operation thereof from its first position to its second position, and the release of fluid under pressure from the other storage reservoir to atmosphere to increase the differential fluid pressure force established by the fluid under pressure in the one storage reservoir on the first movable abutment whereby said abutments establish a fluid pressure braking force proportional to the degree of the reduction of the pressure in the other storage reservoir by the release of fluid under pressure therefrom to atmosphere.

21. A brake control valve device, as recited in claim 20, further characterized in that said fluid-pressure-operated valve means comprises:

(a) a plurality of valves for controlling the supply of fluid under pressure to and the release of fluid under pressure from said pair of fluid pressure storage reservoirs, and to and from said one side and said other side of said second movable abutment of the brake cylinder device, and (b) a movable abutment for simultaneously operating said plurality of valves when supplied with fluid under pressure by said application and release control valve mechanism.

22. A brake control valve device, as recited in claim 20, further characterized in that said fluid-pressure-operated valve means comprises:

(a) four annular hollow valve seat members having a flange at one end and an annular valve seat at the other, (b) four annular stops, each arranged in coaxial surrounding relationship with one of said annular hollow valve seat members, (c) a first set of four biasing means each arranged to normally bias the flange at one end of one annular hollow valve seat member against a corresponding annular stop, (d) four valves each so disposed in coaxial relationship with one of said annular hollow valve seat members as to be moved into seating contact with the annular valve seat at the other end of said seat member, (e) a second set of four biasing means each disposed between one of said valves and a corresponding one of said annular valve seat members so as to bias each valve away from its annular valve seat, (f) a valve stem secured to each of said valves, and (g) a movable abutment so disposed with respect to said valve stems as to effect shifting of all of said valve stems and the respective valve secured thereto until each valve is seated on its corresponding valve seat whereby each valve controls flow of fluid under pressure to one side of one of said abutments.

23. A brake control valve device, as recited in claim 20, further characterized in that said application and release control valve mechanism comprises:

(a) a first valve for effecting the supply of fluid under pressure from that one of said pair of fluid pressure storage reservoirs that is at said other side of said first abutment to said fluid-pressure-operated valve means to cause shifting thereof from its said first to its said second position, (b) a second valve for effecting a release of fluid under pressure from the other one of said pair of fluid pressure storage reservoirs to atmosphere to render the fluid under pressure in said one of said pair of storage reservoirs effective to increase the differential fluid pressure force acting on the first movable abutment thereby increasing the degree of braking force provided by the brake cylinder device, (c) a pair of spaced-apart coaxial movable abutments, one of which is subject on its respective opposite sides to the pressure in said one of said pair of fluid pressure storage reservoirs and the pressure in a separate source of fluid under pressure, and the other which is subject on its respective opposite sides to the pressure in said other one of said pair of fluid pressure storage reservoirs and the pressure in said separate source, between which pair of abutments said first and second valve means are so disposed that shifting of said pair of abutments in one direction in response to a reduction of the pressure in said separate source effects operation of said first and second valve means, and (d) means associated with said second valve means that insures sequential opening of said first and second valve means and subsequent closing of second valve means without effecting closing of said first valve means.

24. A brake control valve device, as recited in claim 22, further characterized by a fifth valve and valve seat for controlling flow of fluid under pressure from a separate source of fluid under pressure to the one side of the second abutment, and means for limiting flow of fluid under pressure from said separate source of fluid under pressure to said one side of the second abutment.

25. A brake control valve device, as recited in claim 22, further characterized by a choke carried by a spring-loaded check valve, and a valve seat for the check valve, said seat being disposed in series with and on the downstream side of that one of said four valves that controls flow to said other side of said first abutment to provide for a restricted flow of fluid under pressure from a separate source of fluid under pressure to said other side and a subsequent unrestricted flow of fluid under pressure from said other side of said separate source.

26. A brake control valve device, as recited in claim 23, further characterized by means biasing said pair of abutments in a direction opposite said one direction and by fluid-pressure-operated means supplied with fluid under pressure by said first valve means for rendering said means ineffective to bias said pair of abutments in said direction opposite said one direction.

27. A brake control valve device, as recited in claim 22, further characterized by a release valve device operable upon shifting of said abutments in a direction opposite said one direction to release fluid under pressure from said fluid-pressure-operated valve means to atmosphere, and means for shifting said valve means from its said second position to its said first position upon the release of fluid under pressure therefrom.

28. A brake control valve device, as recited in claim 23, further characterized in that the effective area of said one of said pair of abutments is a chosen multiple of the effective area of said other of said pair of abutments.

29. A brake control valve device, as recited in claim 23, further characterized in that the effective area of said one of said pair of abutments is 1.8 times the effective area of said other of said pair of abutments.

30. A brake control valve device, as recited in claim 24, further characterized in that said fifth valve comprises a check valve and said limiting means comprises a spring for normally biasing said check valve into seating engagement with said valve seat.

31. A brake control valve device, as recited in claim 26, further characterized in that said biasing means comprises a spring, and said fluid-pressure-operated means comprises a piston having a piston rod extending from one side thereof into engagement with one of said pair of abutments, said piston rod being moved out of engagement with said one abutment in response to the supply of fluid under pressure to said one side of said piston by said first valve means.

32. A brake control valve device, as recited in claim 27, further characterized in that said valve means comprises:

(a) an annular valve seat, and (b) a hollow cylindrical member having formed integral therewith intermediate its ends a collar for engaging said annular valve seat, one end of said hollow cylindrical member abutting one side of one of said pair of abutments, said hollow cylindrical member enabling the respective opposite ends of said member to be subject to the pressure of the fluid acting on said one side of said one abutment thereby enabling balancing of said member by said fluid acting on said one side of said one abutment.

*33. A fluid pressure brake apparatus, as recited in claim 1, further characterized in that said valve means is operable to effect the supply of fluid pressure to said one side of said smaller abutment in response to charging said brake pipe to said certain chosen pressure to urge said smaller abutment toward said release position, and to effect the release of fluid pressure from said one side of said smaller abutment in response to a reduction of the pressure in said brake pipe from said chosen pressure.*

* * * * *